US010808123B2

(12) United States Patent
Meure et al.

(10) Patent No.: US 10,808,123 B2
(45) Date of Patent: Oct. 20, 2020

(54) NANOPARTICLES FOR IMPROVING THE DIMENSIONAL STABILITY OF RESINS

(71) Applicant: The Boeing Company, Chicago, IL (US)

(72) Inventors: Samuel J. Meure, Fishermans Bend (AU); Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/493,371

(22) Filed: Sep. 23, 2014

(65) Prior Publication Data

US 2016/0083584 A1    Mar. 24, 2016

(51) Int. Cl.
*C08L 83/04*    (2006.01)
*C08L 67/00*    (2006.01)
(Continued)

(52) U.S. Cl.
CPC .............. *C08L 83/04* (2013.01); *B32B 5/024* (2013.01); *B32B 7/03* (2019.01); *B32B 27/12* (2013.01); *B32B 27/285* (2013.01); *B32B 27/308* (2013.01); *B32B 27/32* (2013.01); *B32B 27/34* (2013.01); *B32B 27/36* (2013.01); *B32B 27/40* (2013.01); *C08J 5/005* (2013.01); *C08L 23/06* (2013.01); *C08L 23/12* (2013.01); *C08L 33/00* (2013.01); *C08L 61/16* (2013.01); *C08L 63/00* (2013.01); *C08L 67/00* (2013.01); *C08L 69/00* (2013.01); *C08L 71/00* (2013.01); *C08L 75/04* (2013.01); *C08L 77/00* (2013.01); *C08L 81/04* (2013.01); *C08L 81/06* (2013.01); *H01B 1/128* (2013.01); *B32B 2255/26* (2013.01); *B32B 2260/021* (2013.01); *B32B 2260/046* (2013.01); *B32B 2262/101* (2013.01);
(Continued)

(58) Field of Classification Search
CPC ........................... C08J 5/005; C08K 2201/011
USPC ........................................ 428/297.4; 997/773
See application file for complete search history.

(56) References Cited

U.S. PATENT DOCUMENTS 3,943,090 A    3/1976 Enever
4,306,040 A    12/1981 Baer
(Continued)

FOREIGN PATENT DOCUMENTS

CN    101623266 A    1/2010
EP    0378854    7/1990
(Continued)

OTHER PUBLICATIONS

Kipp, Dale O.. (2004; 2010). Plastic Material Data Sheets. MatWeb, LLC.*
(Continued)

*Primary Examiner* — Jennifer A Gillett

(57) ABSTRACT

A composition may include the resin and a plurality of polymer nanoparticles included in the resin to form a resin mixture. The resin may have a resin coefficient of thermal expansion (CTE), a resin cure shrinkage, and/or a resin heat of reaction. The polymer nanoparticles may have a nanoparticle cure shrinkage less than the resin cure shrinkage, a nanoparticle CTE different than the resin CTE, and/or a nanoparticle heat of reaction less than the resin heat of reaction.

20 Claims, 17 Drawing Sheets

(51) Int. Cl.

| | | |
|---|---|---|
| *C08L 69/00* | (2006.01) | |
| *C08L 75/04* | (2006.01) | |
| *C08L 71/00* | (2006.01) | |
| *C08L 63/00* | (2006.01) | |
| *H01B 1/12* | (2006.01) | |
| *B32B 27/28* | (2006.01) | |
| *C08J 5/00* | (2006.01) | |
| *B32B 5/26* | (2006.01) | |
| *B32B 27/40* | (2006.01) | |
| *B32B 27/30* | (2006.01) | |
| *C08L 77/00* | (2006.01) | |
| *C08L 61/16* | (2006.01) | |
| *C08L 81/06* | (2006.01) | |
| *C08L 81/04* | (2006.01) | |
| *C08L 23/06* | (2006.01) | |
| *C08L 23/12* | (2006.01) | |
| *C08L 33/00* | (2006.01) | |
| *B32B 27/32* | (2006.01) | |
| *B32B 5/02* | (2006.01) | |
| *B32B 27/12* | (2006.01) | |
| *B32B 27/34* | (2006.01) | |
| *B32B 27/36* | (2006.01) | |
| *B32B 7/03* | (2019.01) | |

(52) U.S. Cl.
CPC ... *B32B 2262/103* (2013.01); *B32B 2262/105* (2013.01); *B32B 2264/02* (2013.01); *C08J 2300/24* (2013.01)

(56) References Cited

U.S. PATENT DOCUMENTS

| | | | |
|---|---|---|---|
| 4,629,759 A | 12/1986 | Rock | |
| 4,861,803 A * | 8/1989 | Turner | C08G 18/0876 |
| | | | 521/37 |
| 4,954,195 A | 9/1990 | Turpin | |
| 5,028,478 A | 7/1991 | Odagiri et al. | |
| 5,589,523 A | 12/1996 | Sawaoka | |
| 5,604,266 A * | 2/1997 | Mushovic | B29C 44/3446 |
| | | | 521/122 |
| 5,605,745 A | 2/1997 | Recker et al. | |
| 5,618,857 A | 4/1997 | Newberth | |
| 6,503,856 B1 | 1/2003 | Broadway et al. | |
| 6,508,897 B1 | 1/2003 | Yamaguchi | |
| 6,740,185 B2 | 5/2004 | Baldwin | |
| 6,878,776 B1 * | 4/2005 | Pascault | C08F 220/18 |
| | | | 525/113 |
| 6,900,254 B2 | 5/2005 | Wills | |
| 7,037,865 B1 | 5/2006 | Kimberly | |
| 7,122,250 B2 | 10/2006 | Kinsho et al. | |
| 7,435,693 B2 | 10/2008 | Tsotsis et al. | |
| 7,645,402 B2 | 1/2010 | Choi et al. | |
| 7,655,295 B2 | 2/2010 | Smith et al. | |
| 7,738,763 B2 | 6/2010 | Ouderkirk | |
| 7,910,636 B2 | 3/2011 | Barker | |
| 8,080,313 B2 | 12/2011 | Bonneau et al. | |
| 8,283,404 B2 | 10/2012 | Allen | |
| 8,288,453 B2 | 10/2012 | Hsu et al. | |
| 8,519,505 B2 | 8/2013 | Hiroshige et al. | |
| 8,703,630 B2 | 4/2014 | LoFaro et al. | |
| 9,517,608 B2 | 12/2016 | Frulloni | |
| 2002/0119331 A1 | 8/2002 | Jiang | |
| 2003/0054150 A1 * | 3/2003 | Evans | B29B 15/105 |
| | | | 428/297.4 |
| 2003/0174994 A1 | 9/2003 | Garito et al. | |
| 2004/0067703 A1 * | 4/2004 | Grunden | B32B 27/04 |
| | | | 442/33 |
| 2005/0070666 A1 * | 3/2005 | Martin | C08J 5/04 |
| | | | 525/191 |
| 2005/0220771 A1 * | 10/2005 | Deslauriers | A61L 27/18 |
| | | | 424/93.7 |
| 2005/0255236 A1 * | 11/2005 | Deng | B05D 7/222 |
| | | | 427/180 |
| 2006/0057355 A1 | 3/2006 | Suzuki et al. | |
| 2006/0154041 A1 * | 7/2006 | Hashimoto | G02F 1/133305 |
| | | | 428/297.4 |
| 2006/0269738 A1 | 11/2006 | Kimberly | |
| 2007/0040299 A1 | 2/2007 | Roth | |
| 2007/0248827 A1 | 10/2007 | Rukavina | |
| 2007/0282059 A1 | 12/2007 | Keller | |
| 2008/0176987 A1 | 7/2008 | Trevet et al. | |
| 2009/0004460 A1 * | 1/2009 | Gruber | B82Y 30/00 |
| | | | 428/323 |
| 2009/0130376 A1 | 5/2009 | Berkel et al. | |
| 2009/0292035 A1 * | 11/2009 | Semmes | C08J 9/0061 |
| | | | 521/141 |
| 2009/0326137 A1 * | 12/2009 | Hsu | C08F 283/01 |
| | | | 524/460 |
| 2010/0249277 A1 * | 9/2010 | Fang | B82Y 30/00 |
| | | | 523/436 |
| 2010/0273382 A1 | 10/2010 | Nandi | |
| 2010/0280151 A1 * | 11/2010 | Nguyen | C08G 59/38 |
| | | | 523/215 |
| 2010/0304119 A1 | 12/2010 | Bonneau | |
| 2010/0305274 A1 | 12/2010 | Bonneau | |
| 2011/0021360 A1 * | 1/2011 | Al-Ghamdi | H01C 7/008 |
| | | | 505/121 |
| 2011/0028308 A1 | 2/2011 | Shah et al. | |
| 2011/0097568 A1 | 4/2011 | Kamae | |
| 2012/0064283 A1 | 3/2012 | Hill et al. | |
| 2012/0261174 A1 * | 10/2012 | Chuma | C08L 63/00 |
| | | | 174/260 |
| 2013/0029574 A1 | 1/2013 | Van Der Steen | |
| 2013/0161502 A1 | 7/2013 | Wilson | |
| 2013/0167502 A1 | 7/2013 | Wilson et al. | |
| 2013/0221285 A1 | 8/2013 | Song et al. | |
| 2014/0023862 A1 | 1/2014 | Johnson | |
| 2014/0038481 A1 | 2/2014 | Chen | |
| 2014/0076198 A1 | 3/2014 | Kim | |
| 2014/0087178 A1 | 3/2014 | Arai | |
| 2014/0295723 A1 | 10/2014 | Nelson | |
| 2015/0056882 A1 | 2/2015 | Fukuda et al. | |
| 2015/0252184 A1 | 9/2015 | Arai | |
| 2015/0259493 A1 | 9/2015 | Nederkoorn | |
| 2016/0194530 A1 | 6/2016 | Halterman | |
| 2016/0300810 A1 | 10/2016 | Kanamori | |

FOREIGN PATENT DOCUMENTS

| | | |
|---|---|---|
| EP | 1066224 | 12/2001 |
| EP | 2236549 A1 | 10/2010 |
| EP | 2886590 A1 | 6/2015 |
| JP | H11004081 | 1/1991 |
| JP | H03284988 | 12/1991 |
| JP | H04363215 | 12/1992 |
| JP | H11269393 | 10/1999 |
| JP | 2003166174 | 6/2003 |
| JP | 2008510844 | 4/2008 |
| JP | 2010222422 | 1/2010 |
| JP | 2004162007 | 6/2010 |
| JP | 2010126702 | 6/2010 |
| JP | 2010242083 | 10/2010 |
| JP | 2011157491 | 8/2011 |
| JP | 2012528236 | 11/2012 |
| JP | 2013166854 | 8/2013 |
| WO | WO1999021697 | 5/1999 |
| WO | WO2009119467 | 1/2009 |
| WO | WO2010138546 | 12/2010 |
| WO | WO2014050264 | 4/2014 |
| WO | WO2014073960 | 5/2014 |
| WO | WO2014074767 A1 | 5/2014 |
| WO | WO2015097283 | 7/2015 |

OTHER PUBLICATIONS

HexFlow® RTM6, Product Data. http://ww.hecel.com/Resources/DataSheets/RTM-Data-Sheets/RTM6_global.pdf. retrieved Dec. 15, 2011, Wayback Machine.*

(56) References Cited

OTHER PUBLICATIONS

Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.*
Elastomeric, Define. Dictionary.com, http://dictionary.com/browse/elastomeric, retrieved Dec. 9, 2016.*
Theriault, Richard, Tim Osswald, and Linda Stradin, Properties of Thermosetting Polymers During Cure, In: Proceedings of the 55th Annual Technical Conference, Toronto, Canada, pp. 766-773. 1997.*
Li, Chunyu, Eric Coons, and Alejandro Strachan, Material Property Prediction of Thermoset Polymers by Molecular Dynamic Simulations, Acta Mechanica, Apr. 2014, vol. 225, No. 4, p. 1187-1196.*
European Search Report for EP15186477, dated Jan. 22, 2016.
Sober, D.J., "Kaneka Core-Shell Toughening Systems for Thermosetting Resins," 2007.
Suzuki, M.; Nagai, A.; Suzuki, M., Takahashi, A.: "Relationship between Structure and Mechanical Property for Bismaleimide-Biscyanamide resin," 1992. J. App. Poly. Sci, 45, pp. 177-180.
Fan, H.; Lei, Z.; Pan, J.H.; Zhao, X.S., "Sol-gel synthesis, microstructure and adsorption properties of hollow silica spheres," Materials Letters 65 (2011), 1811-1814.
Hackett et al., "The Effect of Nanosilica Concentration on the Enhancement of Epoxy Matrix Resins for Prepreg Composites," Society for the Advancement of Material and Process Engineering, 2010.
Nagavarma et al., "Different Techniques for Preparation of Polymeric Nanoparticles—A Review," Asian Journal of Pharmaceutical and Clinical Research, vol. 5, Suppl 3, 2012.
Zarrelli et al., "Investigation of cure induced shrinkage in unreinforced epoxy resin," Plastics, rubber and composites 31, dated 2002.
European Search Report for EP15186490, dated Jan. 22, 2016.
Hydro, et al., Journal of Polymer Science: Part B: Polymer Physics, 45,1470-1481 (2007).
EPO, Examination Report dated Apr. 28, 2017, for 15186477.4.
European Search Report for EP15186477.4, dated Oct. 3, 2017.
European Office Action for EP15186477, dated May 9, 2018.
Magniez et al., "Apparent Volumetric Shrinkage Study of RTM6 Resin During the Curing Process and Its Effect on the Residual Stresses in a Composite," Polymer Engineering & Science, vol. 52, Issue 2, Aug. 8, 2011.
Lee et al., "Heat of reaction—Degree of Cure and Viscosity of Hercules 3501-6 Resin," Journal of Composite Materials, vol. 16, issue 6, pp. 510-520, Nov. 1, 1982.
McKague et al., "Design and Process Integration for Low-Cost Manufacturing," Journal of Advanced Materials, vol. 37, No. 1, Jan. 2005.
Kessler, "8-Cyanate Ester Resins—Encyclopedia of Composites," Wiley Encyclopedia of Composites, Second Edition, Jul. 20, 2012.
Fu et al., "Synthesis, Thermal Polymerization, and Properties of Benzoxazine Resins Containing Fluorenyl Moiety," Polymer Engineering & Science, vol. 52, Issue 11, Jun. 19, 2012.
Fu et al., "Effects of particle size, particle/matrix interface adhesion and particle loading on mechanical properties of particulate-polymer composites," Composites Part B: Engineering, vol. 39, Issue 6, pp. 907-1068, Sep. 2008.
Salviato et al., "Nanoparticle debonding strength: A comprehensive study on interfacial effects," International Journal of Solids and Structures, vol. 50, Issues 20-21, pp. 3225-3232, Oct. 1, 2013.
Zhang et al., "Miscibility, morphology, mechanical, and thermodynamic properties of epoxy resins toughened with functionalized core-shell nanoparticles containing epoxy groups on the surface," Pigment & Resin Technology, vol. 43 Issue: 1, pp. 8-18.
Japanese Patent Office, Japanese Office Action for Application No. 2015177272 dated Jul. 19, 2019.

* cited by examiner

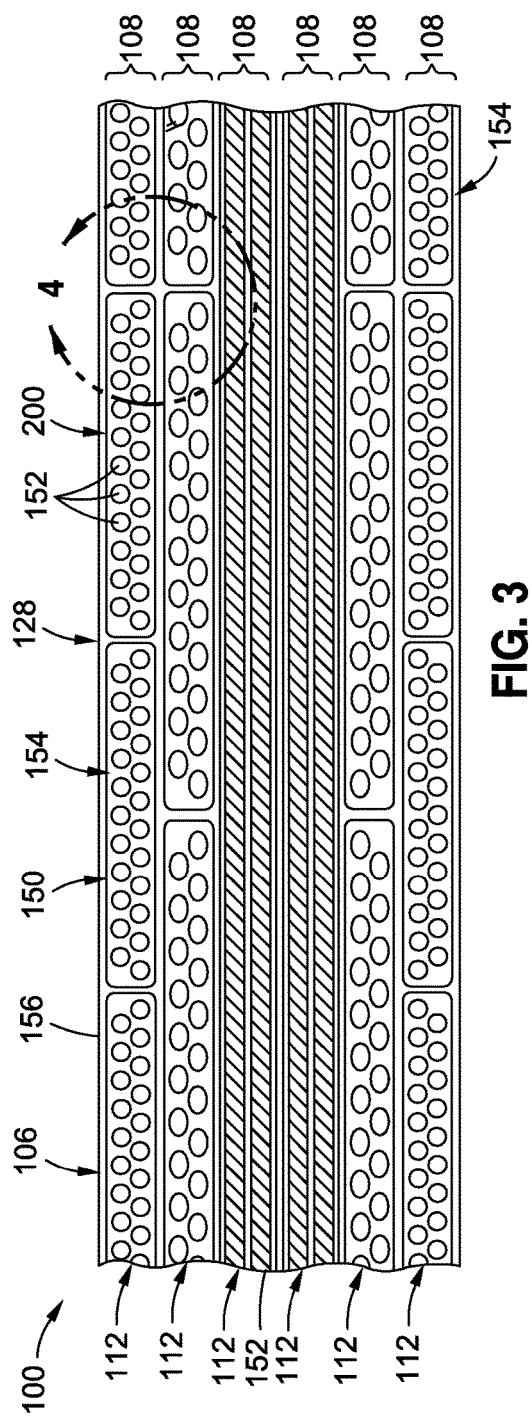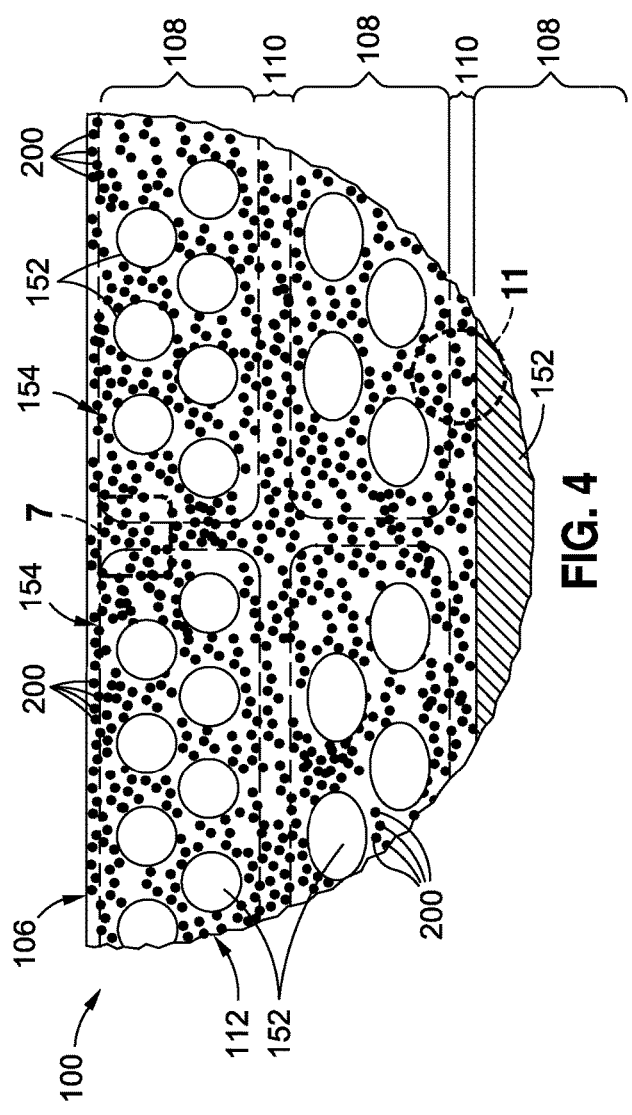

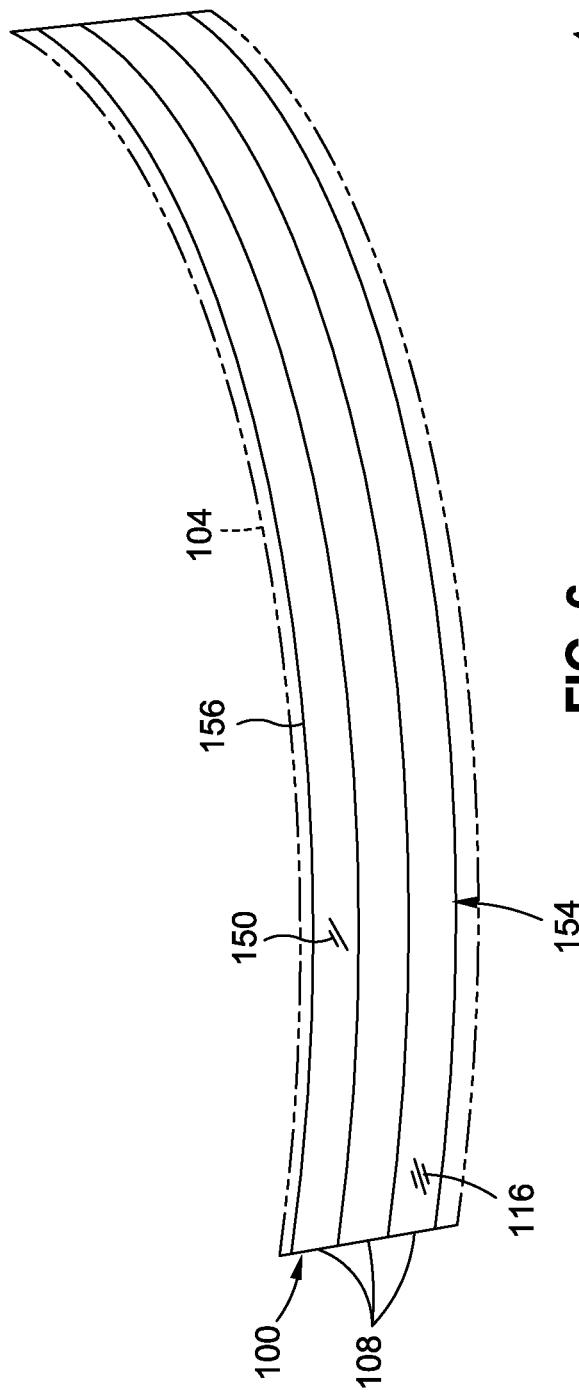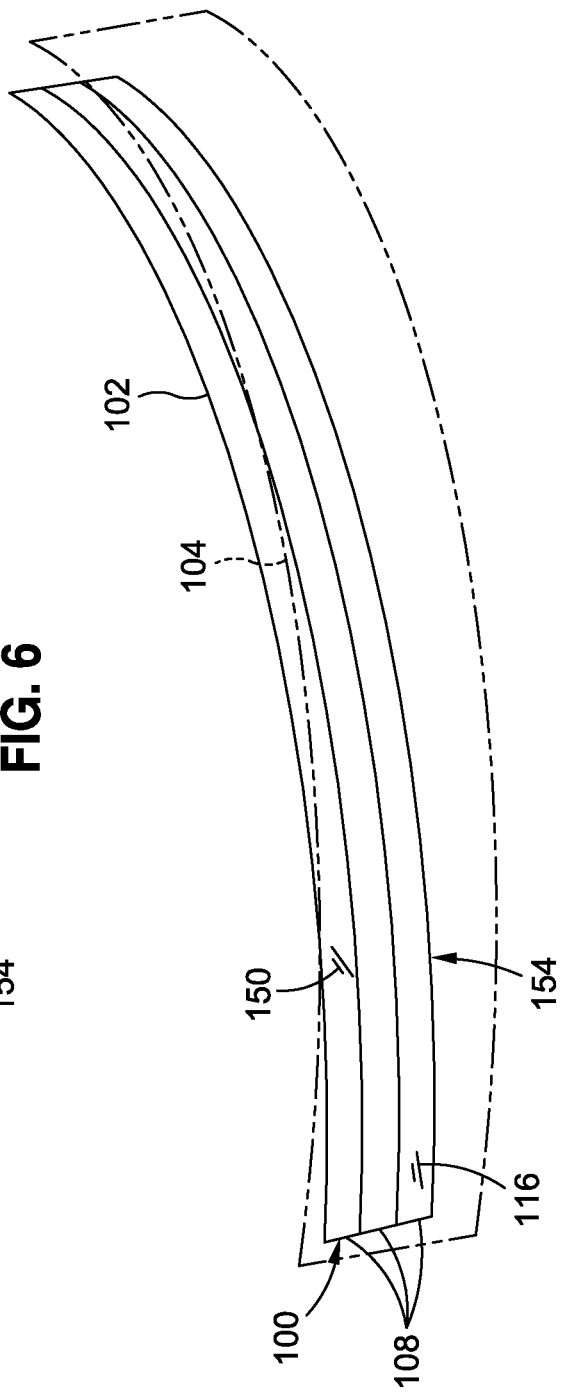

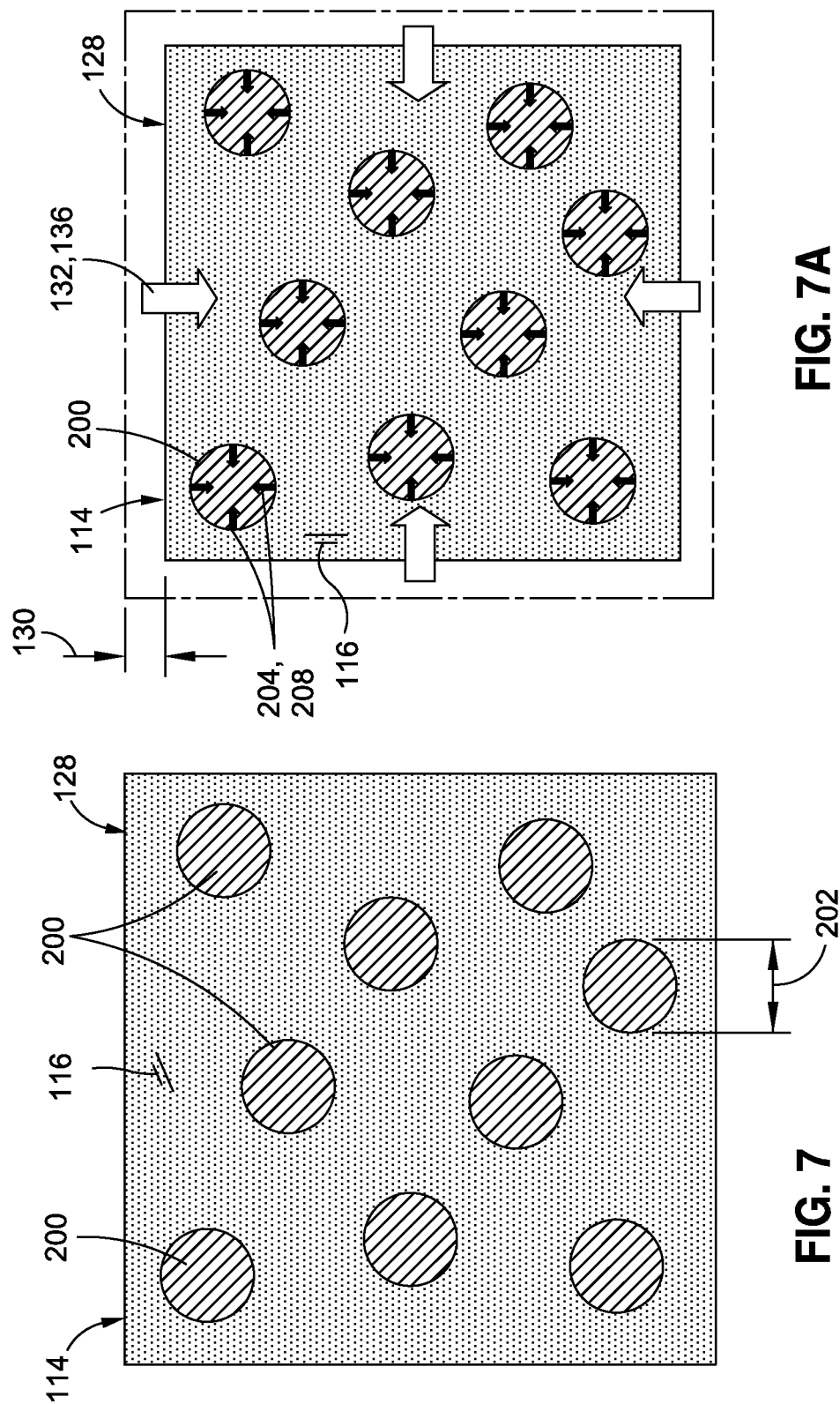

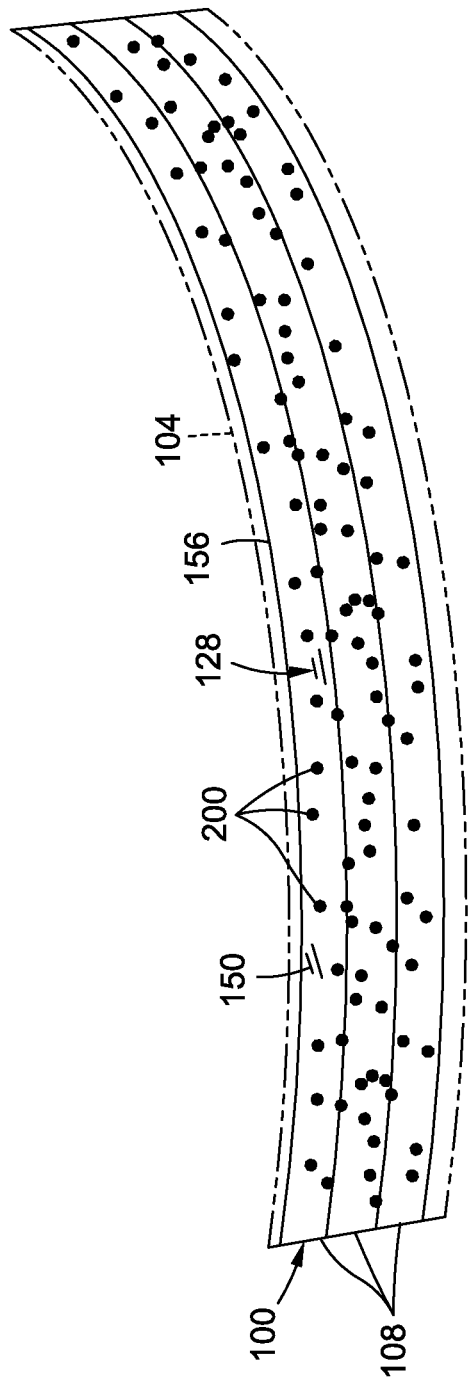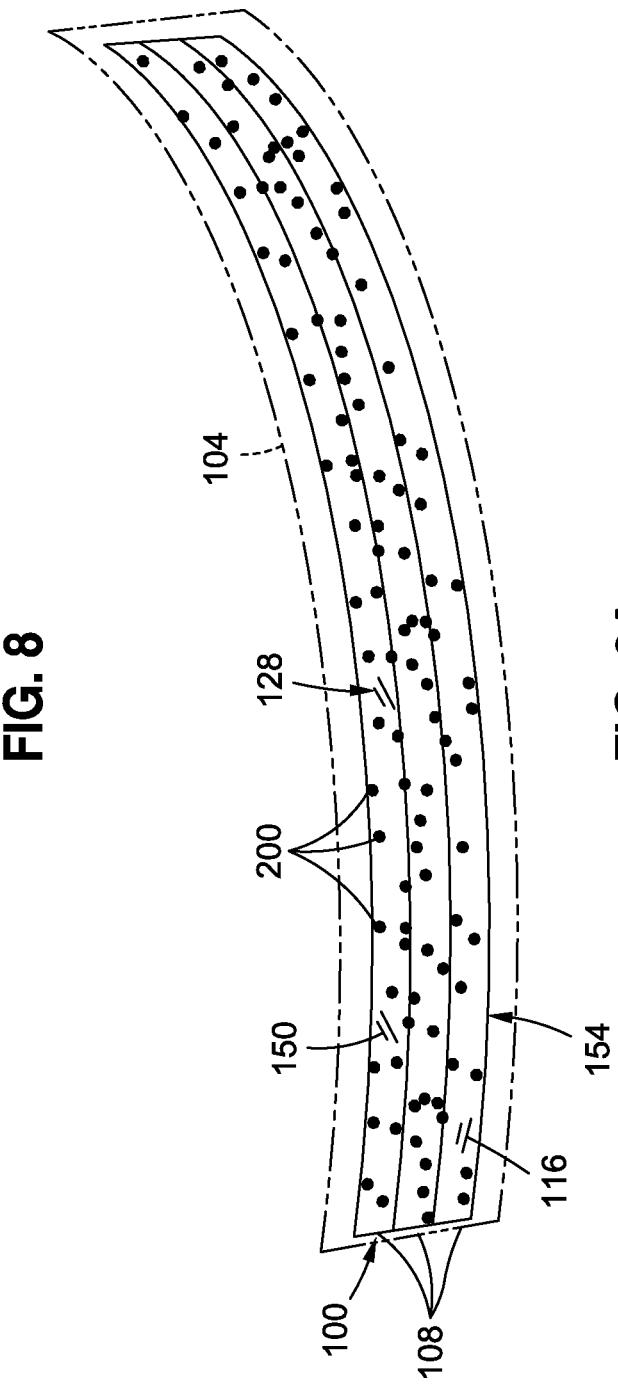

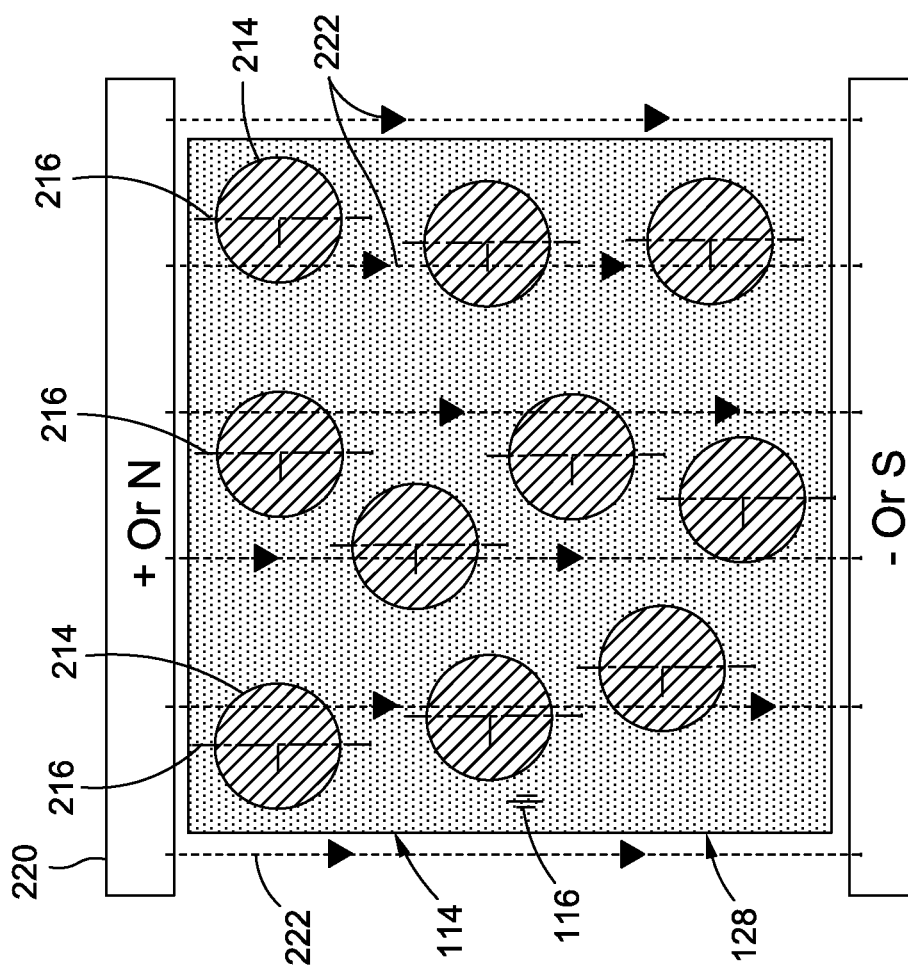
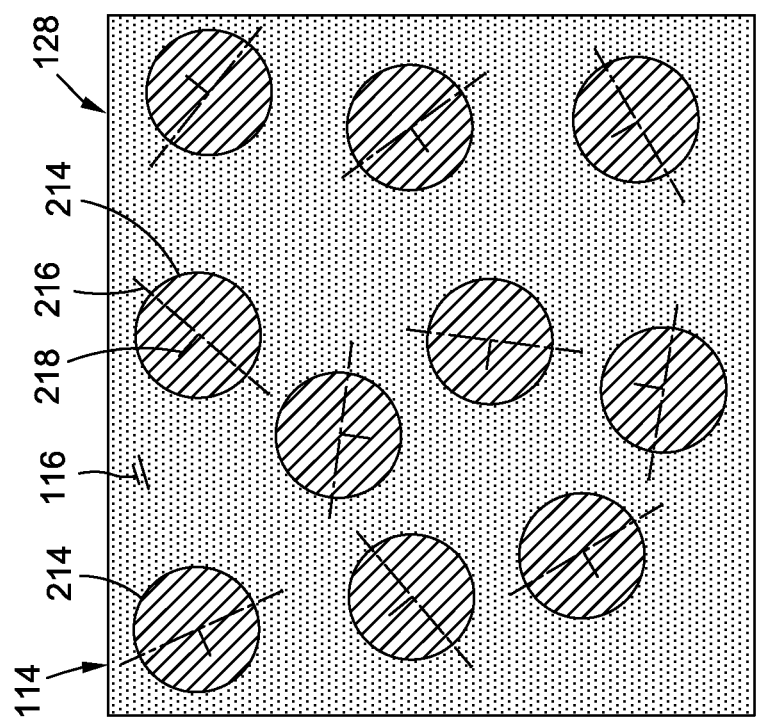

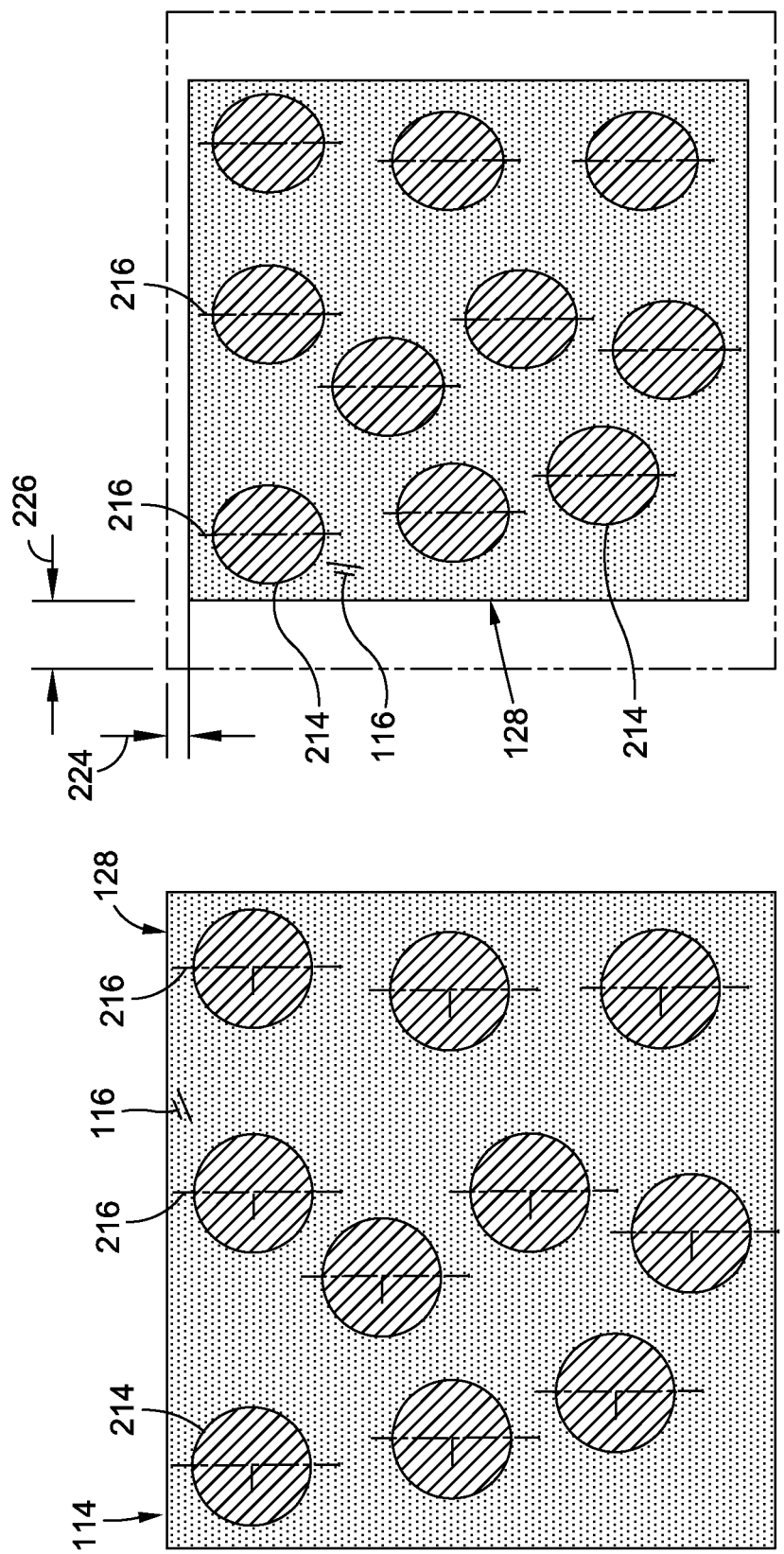

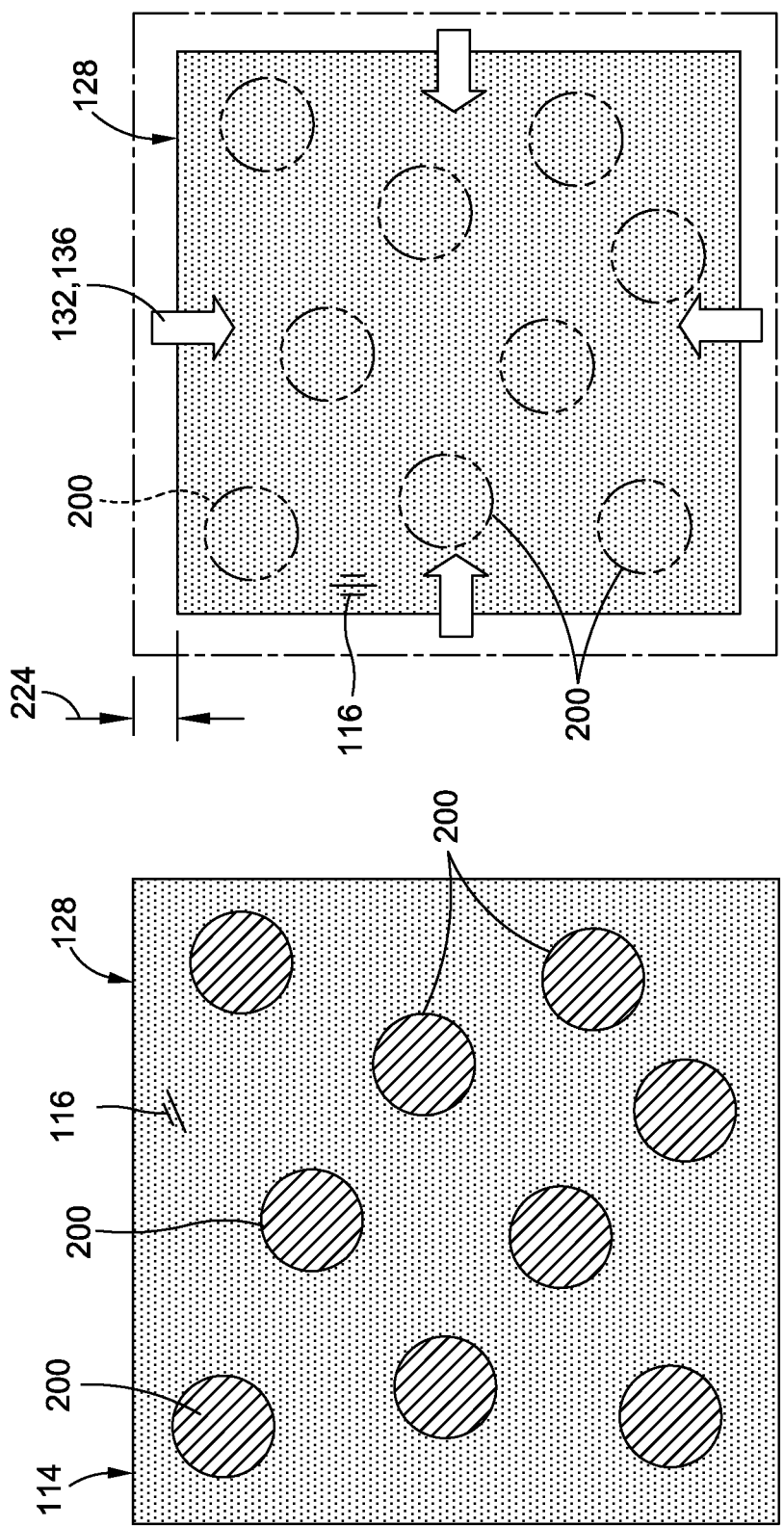

NANOPARTICLES FOR IMPROVING THE DIMENSIONAL STABILITY OF RESINS

FIELD

The present disclosure relates generally to composite materials and, more particularly, to the use of nanoparticles in composite structures.

BACKGROUND

The manufacturing of a composite structure may include applying uncured resin to reinforcing fibers of a composite layup. The temperature of the composite layup may be increased to reduce the viscosity of the resin so that the resin may flow and infuse into the fibers. The composite layup may be held at an elevated temperature for a predetermined period of time to cure the resin into a solidified or hardened state. After the resin has cured, the composite structure may be passively or actively cooled to ambient temperature.

In many composite material systems, the resin may have a coefficient of thermal expansion (CTE) that may be different than the CTE of the reinforcing fibers. For example, epoxy resins may have a CTE that may be an order of magnitude greater than the CTE of carbon fibers. The difference in CTE may result in the resin and fibers contracting by different amounts as the composite structure cools down from the curing temperature. The difference in contraction of the resin relative to the fibers may result in thermally-induced stresses in the resin. The thermally-induced stresses may result in undesirable microcracking in the resin. Microcracking may also occur during the service life of a composite structure due to changes in temperature of the operating environment of the composite structure and/or during mechanical loading of the composite structure.

In addition, thermosetting resins may exhibit volumetric cure shrinkage during curing of the thermosetting resin. The cure shrinkage may occur due to the cross-linking reaction of the resin as the resin changes from liquid to solid. The cure shrinkage of the resin may result in internal stresses in the resin which may lead to microcracking in the resin under mechanical loading or during thermal cycling. Internal stresses within the resin may also result in distortion and/or warping of the shape of the cured composite structure. Exothermic heating in thick sections of a curing composite layup may also result in distortion in the shape of the cured composite structure.

Prior art attempts to reduce or prevent microcracking include the addition of tougheners to liquid resin. Conventional thermoset resins may be formed using liquid polymers to form an uncured liquid resin. Alternatively, solid polymers may be dissolved into liquids during mixing to form an uncured liquid resin. Tougheners in liquid or solid form may be added to the uncured liquid resin to improve the resistance of the resin to microcracking. Unfortunately, adding tougheners to resin may result in a reduction in the final resin glass transition temperature during curing, or the tougheners may increase the required cure temperature of the resin and/or cause excessive cure shrinkage of the resin.

In addition, tougheners often increase the viscosity of the resin which may impair manufacturability and thus effectively limit the amount of toughener that can be added to the resin. Advanced thermoset resins typically require relatively high cure temperatures (e.g., 350-600° F.) to fully cure the thermoset resin/composite. Such high cure temperatures may result in increased thermally-induced stresses and strains due to the differential CTE between the fibers and resin.

As can be seen, there exists a need in the art for a system and method for improving the properties of a resin such as reducing the difference in CTE between the resin and fibers and reducing the cure shrinkage of the resin.

SUMMARY

The above-noted needs associated with resins are specifically addressed by the present disclosure which provides a composition that may include a plurality of polymer nanoparticles in a resin to form a resin mixture. The resin may have a resin coefficient of thermal expansion (CTE), a resin cure shrinkage, and/or a resin heat of reaction. The polymer nanoparticles may have a nanoparticle cure shrinkage that may be less than the resin cure shrinkage, a nanoparticle CTE that is different than the resin CTE, and/or a nanoparticle heat of reaction that is less than the resin heat of reaction.

Also disclosed is a composite structure which may include a resin, a plurality of polymer nanoparticles included in the resin to form a resin mixture, and a plurality of reinforcing fibers embedded within the resin mixture. The polymer nanoparticles may have a nanoparticle cure shrinkage less than the resin cure shrinkage, a nanoparticle CTE different than the resin CTE, and/or a nanoparticle heat of reaction less than the resin heat of reaction.

Additionally disclosed is a method of forming a composition. The method may include adding a plurality of polymer nanoparticles to a resin to form a resin mixture. The polymer nanoparticles may have at least one of the following properties: a nanoparticle cure shrinkage less than the resin cure shrinkage, a nanoparticle CTE different than the resin CTE, and a nanoparticle heat of reaction less than the resin heat of reaction.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 shows a cross-section of a portion of a composite structure showing reinforcing filaments of the unidirectional composite plies oriented at different angles;

FIG. 4 is an enlarged view of a portion of the composite structure taken along line 4 of FIG. 3 and showing a plurality of polymer nanoparticles in the resin;

FIG. 6 is a schematic illustration of an uncured composite layup made from unidirectional plies of reinforcing fibers and including unmodified resin;

FIG. 6A is a schematic illustration of the cured composite structure of FIG. 6 showing distortion of the overall shape extending outside of the tolerance boundary of the composite structure as a result of the cure shrinkage and/or contraction of the cured composite structure;

FIG. 7 is a schematic illustration of an uncured resin mixture taken along line 7 of FIG. 4 and illustrating a plurality of polymer nanoparticles formed of a different material than the resin and having a lower cure shrinkage and/or a lower CTE than the resin;

FIG. 7A is a schematic illustration of the cured resin mixture of FIG. 7 and showing a reduction in the net shrinkage of the resin mixture relative to unmodified resin as a result of the lower cure shrinkage and/or lower contraction of the polymer nanoparticles;

FIG. 8 is a schematic illustration of an uncured composite layup made from unidirectional plies of reinforcing fibers and including a resin mixture containing polymer nanoparticles;

FIG. 8A is a schematic illustration of the cured composite structure of FIG. 8 showing a reduction in the distortion of the overall shape of the composite structure as a result of the lower cure shrinkage and/or lower contraction of the cured composite structure due to the addition of the polymer nanoparticles;

FIG. 9 is a schematic illustration of an uncured resin mixture containing a plurality of directional-CTE polymer nanoparticles each having an axis along which the CTE is lower (e.g., the axis of lower CTE) than the CTE of the polymer nanoparticle along another axis (e.g., the axis of higher CTE), and wherein the CTE axes of the polymer nanoparticles are oriented in random directions;

FIG. 9A is a schematic illustration of the application of an electric or magnetic field to the uncured resin mixture causing the axis of lower CTE of each one of the directional-CTE polymer nanoparticles to align with electric or magnetic field lines;

FIG. 10 is a schematic illustration of an uncured resin mixture containing a plurality of directional-CTE polymer nanoparticles with the axes of lower CTE aligned with one another;

FIG. 10A is a schematic illustration of the cured resin mixture of FIG. 10 wherein the contraction of the resin mixture along a direction parallel to the axes of lower CTE is less than the contraction of the resin mixture along a direction parallel to the axes of higher CTE;

FIG. 12 is a schematic illustration of an uncured resin mixture containing a plurality of cured polymer nanoparticles formed of the same material as the resin;

FIG. 12A is a schematic illustration of the cured resin mixture of FIG. 12 and showing a reduction in the net shrinkage relative to an unmodified resin due to the absence of contraction of the cured polymer nanoparticles and/or due to the polymer nanoparticles physically constraining the resin cure shrinkage and/or the resin contraction;

DETAILED DESCRIPTION

Figure 1:
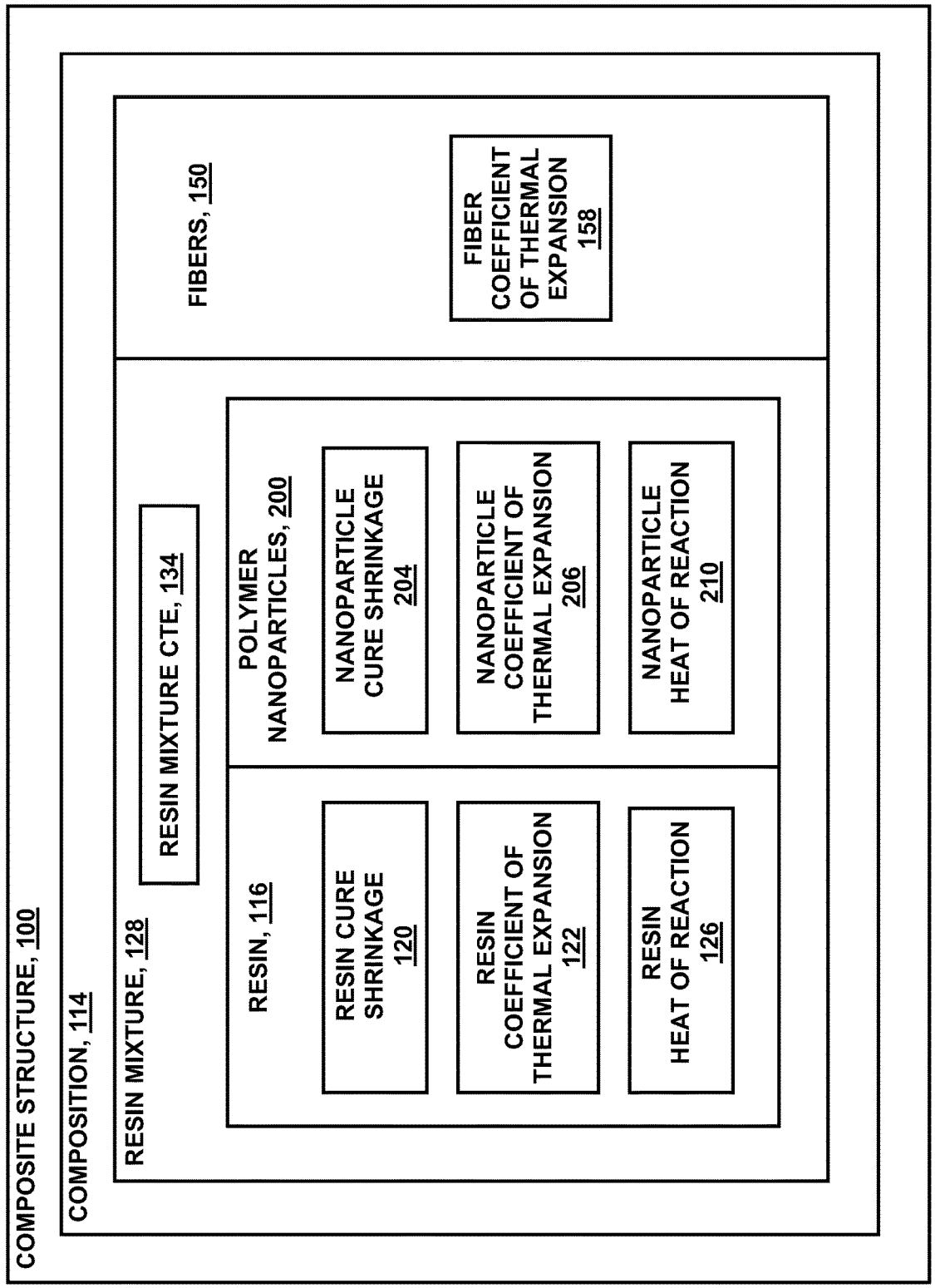
FIG. 1 is a block diagram of a composite structure including reinforcing fibers and a resin mixture comprising resin containing polymer nanoparticles.

Referring now to the drawings wherein the showings are for purposes of illustrating various embodiments of the disclosure, shown in FIG. 1 is a block diagram of a composite structure 100. The composite structure 100 may include a composition 114 of a resin mixture 128 and reinforcing fibers 150 embedded within the resin mixture 128. The fibers 150 may be formed of a plurality of reinforcing filaments 152 (FIG. 3). The fibers 150 may have a fiber coefficient of thermal expansion (CTE) 158. The resin mixture 128 may have a resin coefficient of thermal expansion (CTE) 122, a resin cure shrinkage 120, and a resin heat of reaction 126. The resin CTE 122 may be described as the change in unit volume of the resin 116 with change in temperature of the resin 116. For example, an increase in temperature of the resin 116 may result in an increase in the volume of the resin 116. A decrease in the temperature of the resin 116 may result in a decrease in the volume of the resin 116. The resin cure shrinkage 120 may be described as the shrinking of the resin volume during the cross-linking reaction or polymerization of the resin 116 as the resin 116 cures and changes from a liquid to a solid. Cure shrinkage of the resin 116 may be a linear function of the degree of cure. The resin heat of reaction 126 may be described as the energy or heat that is released from the resin 116 during the cross-linking or polymerization of the resin 116 during the curing process.

As indicated above, resin cure shrinkage 120 and/or resin-fiber CTE mismatch may result in internal stresses in the resin 116 (FIG. 1) of a cured composite structure 100. Such internal stresses may result in undesirable effects including, but not limited to, microcracking in the resin 116, shape distortion 102 (FIG. 6A) or warpage of the cured composite structure 100, a reduction in the mechanical properties of the composite structure 100, and other effects. In some examples, internal stress in the resin 116 may compromise the integrity of the composite structure 100 during mechanical loading and/or thermal cycling of the composite structure 100.

Excessive resin heat of reaction 126 during curing of the resin 116 may increase the temperature the resin 116 beyond predetermined resin temperature limits. For example, excessive heat release by the resin 116 (FIG. 1) during curing may result in thicker sections of a composite layup 106 getting hotter than thinner section due to the increased volume of resin 116 in the thicker sections. Differential heating of the composite layup 106 (FIG. 2) may result in distortion or warpage of the composite structure 100 during cool down from an elevated curing temperature. Furthermore, excessive resin heat of reaction 126 (FIG. 1) may result in changes in the extent of resin cure following the curing cycle. In addition, excessive resin heat of reaction 126 may cause overheating of the resin 116 which may result in a reduction in the mechanical strength and performance of the composite structure 100. In some examples, excessive heat of reaction during resin cure may result in the resin 116 exceeding its combustion temperature which may result in the combustion (e.g., fire) of the resin 116 or composite layup 106 and surrounding equipment, and which may be accompanied by the release of undesirable organics.

Referring still to FIG. 1, the present disclosure may advantageously include the addition of a plurality of polymer nanoparticles 200 to the resin 116 to form a resin mixture 128. The polymer nanoparticles 200 may be selected to alter the resin properties and avoid one or more undesirable effects associated with unmodified resin. In the present disclosure, unmodified resin may be described as resin not containing polymer nanoparticles 200. In some examples, the polymer nanoparticles 200 may be a least partially solidified and/or pre-cured prior to curing the resin 116 which may ensure the stability of the polymer nanoparticles 200 in the resin 116. For example, the polymer nanoparticles 200 may be completely or substantially solidified and/or substantially cured prior to curing the resin 116. Polymer nanoparticles 200 that are partially pre-cured prior to mixing with the resin 116 may be post-cured during the resin curing or solidification cycle. Polymer nanoparticles 200 may be added to thermosetting resins and to thermoplastic resins to tailor the properties of the resins. Advantageously, the polymer nanoparticles 200 may be provided in a broad spectrum of materials which may facilitate the ability to tailor a wide range or resin properties over a wide range of property values.

In any one of the examples disclosed herein, a resin mixture 128 may include polymer nanoparticles 200 that have a nanoparticle cure shrinkage 204 (e.g., during the resin cure cycle) that is less than the resin cure shrinkage 120 (FIG. 1). As described in greater detail below, by adding polymer nanoparticles 200 that have a lower cure shrinkage 204 than the resin cure shrinkage 120, the cure shrinkage 132 (FIG. 7A) of the resin mixture 128 may be reduced relative to the cure shrinkage of resin not containing polymer nanoparticles 200 (e.g., unmodified resin). The reduction in cure shrinkage 132 of the resin mixture 128 (FIG. 1) may be due to a reduction in the cumulative volumetric shrinkage of the resin mixture 128, and/or may be due to the polymer nanoparticles 200 physically constraining the resin 116 against cure shrinkage 120, as described in greater detail below.

In any one of the examples disclosed herein, a resin mixture 128 may include polymer nanoparticles 200 that have a nanoparticle CTE 206 (FIG. 1) that may be different than the resin CTE 122. For example, polymer nanoparticles 200 may be added to resin 116 wherein the polymer nanoparticles 200 have a nanoparticle CTE 206 that is lower than the resin CTE 122. The lower nanoparticle CTE 206 may effectively reduce the resin mixture CTE 134 (FIG. 1), and may thereby reduce the CTE mismatch between the resin mixture 128 and the reinforcing fibers 150 (FIG. 1) of a composite layup 106. As mentioned above, a reduction in the resin-fiber CTE mismatch may result in a reduction in internal stresses in the resin mixture 128 relative to internal stresses in a resin not containing the polymer nanoparticles 200, and may thereby reduce or prevent crack initiation or crack growth in the resin 116 (FIG. 1). Furthermore, a reduction in the resin-fiber CTE mismatch may have a significant effect on reducing or preventing shape distortion 102 of the cured composite structure 100. It should be noted that the present disclosure is not limited to polymer nanoparticles 200 that have a nanoparticle CTE 206 that is lower than the resin CTE 122. For example, in some applications, it may be desirable for the nanoparticle CTE 206 to be higher than the resin CTE 122 (FIG. 1) such that the resin mixture CTE 134 is increased relative to the CTE of modified resin.

Figure 16:
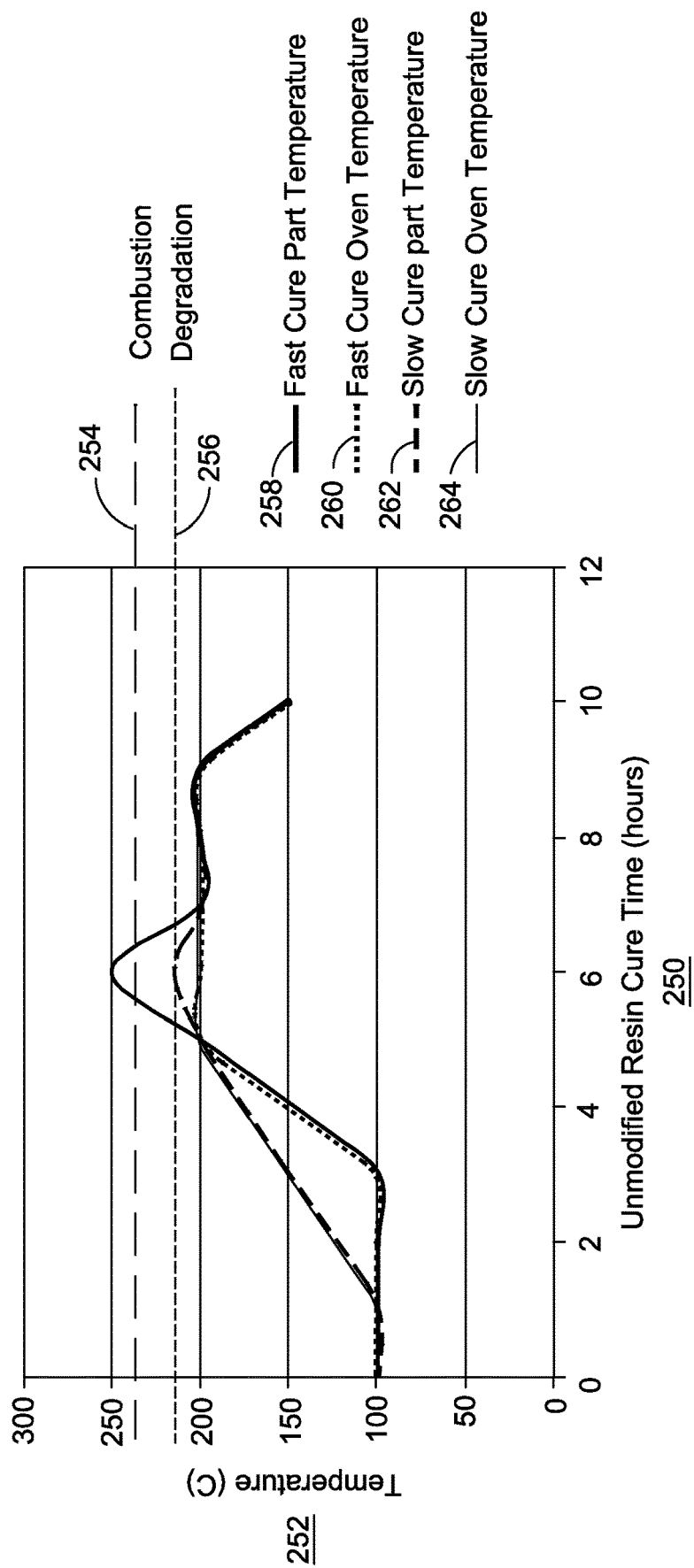
FIG. 16 is a time-temperature plot of a cure cycle of a composite layup including unmodified resin and illustrating an increase in temperature of the unmodified resin above the combustion temperature and potentially resulting in damage to the composite layup due to overheating during fast cure cycles.

In any one of the examples disclosed herein, a resin mixture 128 may include polymer nanoparticles 200 that have a nanoparticle heat of reaction 210 that may be less than the resin heat of reaction 126. Advantageously, a low nanoparticle heat of reaction 210 (FIG. 14A) may result in an effective reduction in the heat of reaction 138 (FIG. 14A) of a resin mixture 128 containing the polymer nanoparticles 200. The reduced heat of reaction 210 of the polymer nanoparticles 200 (FIG. 1) may be exhibited during the resin cure cycle and, in particular, during the peak reaction time of the resin 116 (FIG. 1) during the cure cycle. The low nanoparticle heat of reaction 210 may result in a reduction in the total amount of heat generated during curing of the resin mixture 128 (FIG. 1) due to a reduction in the amount of energy generated during resin curing, and due to the polymer nanoparticles 200 acting as heat sinks. Advantageously, the reduction in the resin mixture heat of reaction 138 may result in a reduced cure temperature of a composite layup 106 which may reduce shape distortion 102 (FIG. 6) of the cured composite structure 100. In addition, the reduction in the resin mixture heat of reaction 138 (FIG. 14) may allow the temperature of the resin mixture 128 to be maintained below a degradation temperature limit 256 (FIG. 16) and/or below a combustion temperature limit 254 (FIG. 16). Furthermore, the reduction in the resin mixture heat of reaction 138 may avoid compromising the mechanical strength and performance of the final composite structure 100.

As discussed in greater detail below, the polymer nanoparticles 200 may be provided in a cross-sectional width 202 (FIG. 7) or particle diameter of 10-200 nanometers. In addition, the polymer nanoparticles 200 may be provided in a rounded or spherical shape. Advantageously, the relatively small size and/or generally rounded or spherical shape of the polymer nanoparticles 200 may allow the resin mixture 128 (FIG. 1) to retain a relatively low viscosity at relatively high load levels of polymer nanoparticles 200 in the resin 116. A relatively low viscosity of the resin mixture 128 may facilitate resin flow into and through the reinforcing fibers 150 (FIG. 1) for faster and more reliable processing. Although the present disclosure describes the implementation of polymer nanoparticles 200 in a resin mixture 128 for a composite structure 100, a resin mixture 128 of polymer nanoparticles 200 and resin 116 may be implemented in other applications including, but not limited to, adhesives, coatings, injection moldable plastics, and any one of a variety of other applications. The polymer nanoparticles 200 may be added to thermosetting resins 116 (FIG. 1) and to thermoplastic resins 116 for both prepreg systems and resin infusion systems. The polymer nanoparticles 200 may be added to tailor the properties of the resin 116 and improve the processing, manufacturability, and performance of a composite structure.

Figure 2:
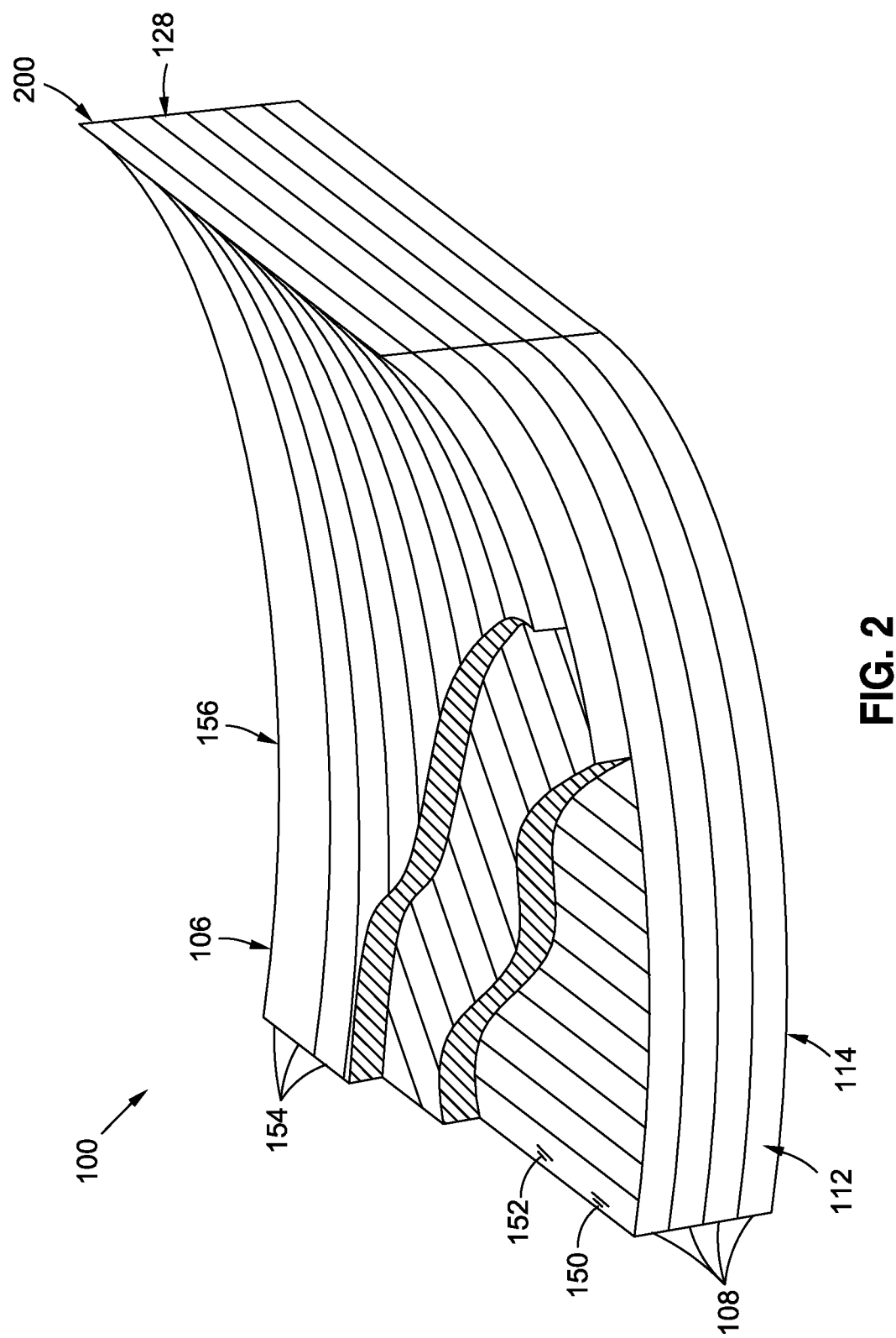
FIG. 2 is a perspective view of a composite structure including a stack of unidirectional plies each formed of a plurality of continuous reinforcing fibers.

FIG. 2 shows an example of a composite structure 100 having a contoured or curved shape and formed as a laminated stack of unidirectional plies 112. Each one of the unidirectional plies 112 may include a plurality of parallel, continuous fiber tows 150 (e.g., reinforcing fibers) or unidirectional tape 154 laid side-by-side. The reinforcing fibers 150 or unidirectional tape 154 may be made up of a plurality of reinforcing filaments 152. A single fiber tow 150 or unidirectional tape 154 may include a bundle of several thousand reinforcing filaments 152 (e.g., 1000 to 100,000 or more reinforcing filaments 152). In some examples, a reinforcing filament may have a filament cross-sectional width or diameter of 5-30 microns. For example, a carbon reinforcing filament may have a filament cross-sectional width of approximately 5-7 microns. Glass reinforcing filaments may have a filament cross-sectional width of 10-25 microns. Although not shown, composite fibers 150 in the present disclosure may also encompass chopped fibers as may be incorporated into a fiber mat. In the present disclosure, the terms reinforcing fiber, fiber tow, and composite fiber may be used interchangeably.

In some examples, a composite structure 100 may be formed of composite plies 108 that may be pre-impregnated with resin 116 (e.g., prepreg composite plies 108) containing polymer nanoparticles 200 (FIG. 1). For example, one or more composite plies 108 of a composite structure 100 may be formed of prepreg fiber tows 150 (FIG. 2), prepreg unidirectional tape 154 (FIG. 2), prepreg woven fabric, braided prepregs (not shown), and other forms of prepreg. In other examples, the composite structure 100 may be laid up with composite plies 108 that may be pre-impregnated with unmodified resin 116, after which polymer nanoparticles 200 may be applied to one or more locations of the composite layup 106.

Alternatively, a composite structure 100 may be formed as one or more dry fiber preforms 156 which may be infused with resin 116. For example, a composite structure 100 may be formed by laying up dry fiber tows 150, dry unidirectional tape 154 (FIG. 2), dry fiber sheets (not shown), dry woven fabric (not shown), and/or other forms of dry fiber. The dry fiber preforms 156 may be arranged in a stack of composite plies 108 into which resin 116 may be infused in a wet layup process. In some examples, unmodified resin 116 may be infused into a dry fiber preform 156 (FIG. 2), after which polymer nanoparticles 200 may be applied to one or more locations of the composite layup 106 (FIG. 2). For example, polymer nanoparticles 200 may be applied to resin-rich pockets (not shown) of a composite layup 106. In other examples, a resin mixture 128 containing polymer nanoparticles 200 may be infused into a dry fiber preform 156 resulting in the polymer nanoparticles 200 distributed in bulk throughout the composite layup 106.

In any one of the examples disclosed herein, the resin 116 (FIG. 1) may be formed from thermoplastic material or thermosetting material. Thermoplastic material may include at least one of the following: acrylics, fluorocarbons, polyamides, polyethylenes, polyesters, polypropylenes, polycarbonates, polyurethanes, polyaryletherketones, and polyetherimides. Thermosetting material may include at least one of the following: polyurethanes, phenolics, polyimides, bismaleimides, polyesters, benzoxazines, condensation polymers, cyanate esters, siloxanes, epoxies, thiols, and phenolics. In any one of the examples disclosed herein, the reinforcing filaments 152 or fibers 150 (FIG. 2) may be formed from materials such as carbons, silicon carbide, boron, ceramic, and metallic material. The reinforcing filaments 152 or fibers 150 may also be formed from glass such as E-glass (alumino-borosilicate glass), S-glass (alumino silicate glass), pure silica, borosilicate glass, optical glass, and other glass compositions.

As indicated above, the polymer nanoparticles 200 may be pre-cured or solidified prior to curing the resin 116. In some examples, the polymer nanoparticles 200 may be pre-cured up to at least a gelled state such that the polymer nanoparticles 200 (FIG. 1) may retain their geometric shape prior to and during curing of the resin 116. In some examples, the polymer nanoparticles 200 may be soluble or semi-soluble in the resin 116. The polymer nanoparticles 200 may remain solid below the glass temperature of the resin 116 and/or below the cure temperature of the resin 116 (FIG. 1). The polymer nanoparticles 200 may be provided in a solid, homogenous configuration such as in a rounded or spherical shape. The polymer nanoparticles 200 may also be provided in a hollow configuration having a rounded or spherical shape.

The polymer nanoparticles 200 (FIG. 1) may be formed of any one of the above-described thermosetting materials or thermoplastic materials. In one example, the polymer nanoparticles 200 may be formed of bismaleimides, polyesters, polyurethanes, polyimides, benzoxazines, condensation polymers, cyanate esters, siloxanes, epoxies, thiols, and phenolics. The polymer nanoparticles 200 may also be formed of polyaryletherketones including, but not limited to, polyetheretherketone (PEEK), polyetherketoneketone (PEKK), and polyetherketoneetherketone (PEKEK). In some examples, at least some of the polymer nanoparticles 200 may have a non-elastomeric thermoset component or material. In other examples, at least some of the polymer nanoparticles 200 may be formed of thermoplastic material without an elastomeric component or material.

Some of the polymer nanoparticles 200 in a composite layup 106 may have a different composition than other polymer nanoparticles 200 in the composite layup 106. In some examples, the polymer nanoparticles 200 may have the same chemical composition as the base resin 116, although the polymer nanoparticles 200 may be partially or fully cured prior to curing the resin 116 which may advantageously reduce the effective cure shrinkage and heat of reaction of the resin mixture 128 (FIG. 1) relative to the cure shrinkage and heat of reaction of unmodified resin. In some examples, the polymer nanoparticles 200 may be provided as core-sheath nanoparticles (not shown) comprising a sheath encapsulating a core. The core may have a chemical composition that is different than the chemical composition of the sheath. The sheath may have a chemical composition (e.g., thermoplastic material) that may at least partially dissolve or melt into the resin 116 during processing (e.g., curing) of the resin 116 to improve the properties of the resin, such as to locally increase the resin toughness.

The polymer nanoparticles 200 may be provided in a cross-sectional width 202 (FIG. 7) or particle diameter of 10-200 nanometers. In some examples, the polymer nanoparticles 200 may have a cross-sectional width 202 of between 10-100 nanometers. However, in other examples, the polymer nanoparticles 200 (FIG. 3) may have a cross-sectional width 202 of up to 2 microns. Providing the polymer nanoparticles 200 in a relatively small cross-sectional width 202 may prevent or reduce filtering out of overly-large nanoparticles during prepregging operations or during resin infusion. In this regard, an overly-large nanoparticle may prevent passage of the nanoparticle between adjacent reinforcing fibers 150 (FIG. 2) or tows.

In some examples, the polymer nanoparticles 200 may be provided in different particle sizes. For example, some of the polymer nanoparticles 200 in a composite layup 106 (FIG. 2) may have a larger cross-sectional width than other polymer nanoparticles 200 in the same composite layup 106. In this regard, the different particle cross-sectional widths 202 of the polymer nanoparticles 200 (FIG. 2) may provide a means to locally improve the resin toughness. In addition, the use of different particle cross-sectional widths 202 may enable different volumetric ratios of liquid resin 116 to nanoparticles within a composite layup 106.

Figure 11:
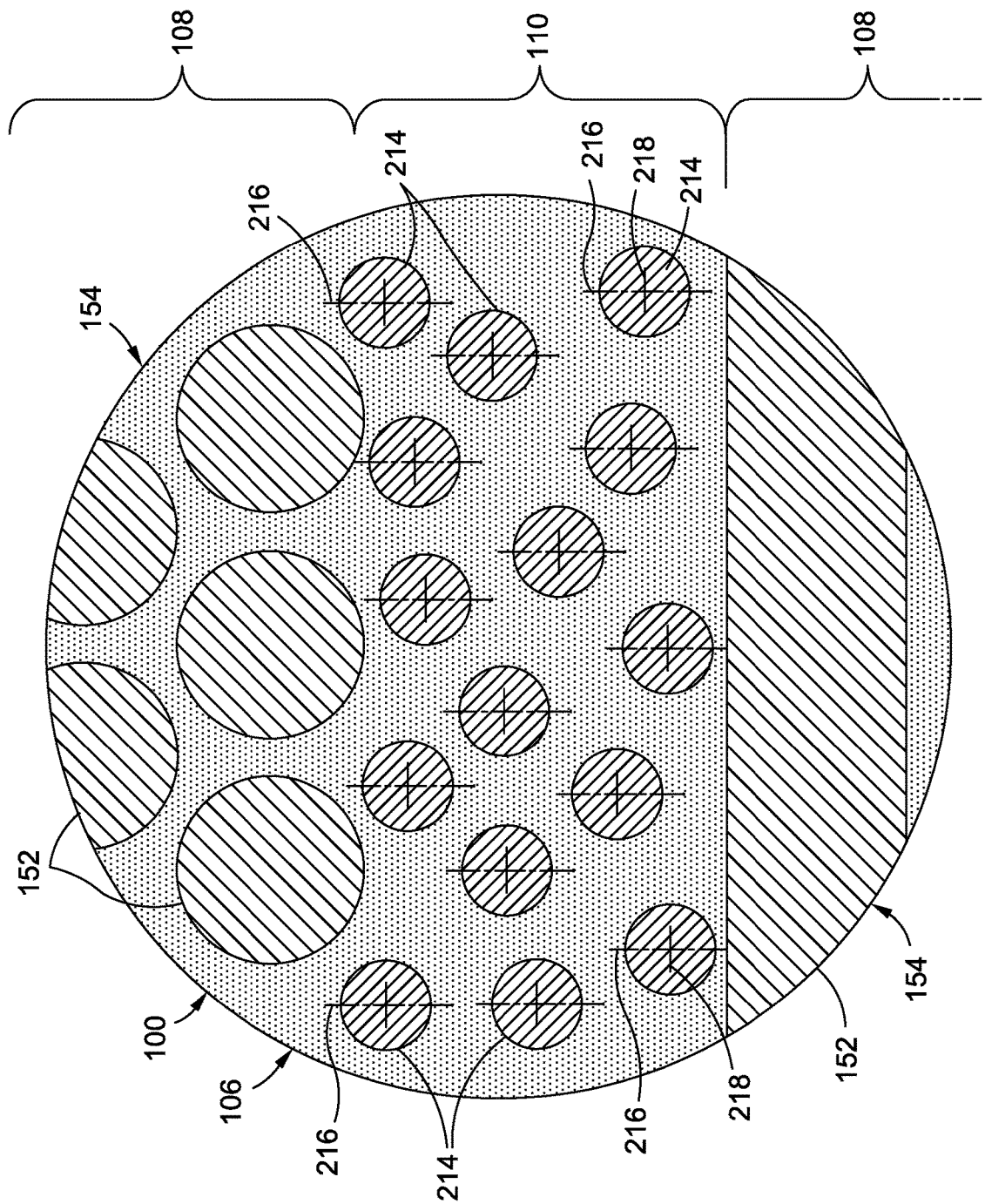
FIG. 11 is a schematic illustration of a portion of the composite layup taken along line 11 of FIG. 4 and showing directional-CTE polymer nanoparticles oriented such that the axis of lower CTE is transverse to a lengthwise direction of the reinforcing filaments or fibers.

The polymer nanoparticles 200 may also be provided in one or more geometric shapes. For example, the polymer nanoparticles 200 may have a generally spherical or rounded outer shape to avoid increasing the resin 116 (FIG. 1) viscosity. In some examples, the polymer nanoparticles 200 may be provided as a solid sphere, a hollow sphere, and/or as a core-sheath nanoparticle (not shown). Core-sheath nanoparticles may include a spherical sheath encapsulating a core which may be formed of a different material than the sheath. For example, the sheath may be formed of thermoplastic material and the core may be formed of silica or the core may be a carbon nanotube having an anisotropic CTE or a directional CTE that may be oriented in a specific direction similar to that which is shown in FIGS. 9-11 and described below. Polymer nanoparticles 200 may optionally be provided in non-spherical shapes that may be shaped to minimize the effect on of the resin 116. For example, the polymer nanoparticles 200 may be provided in generally rounded shapes such as oblong or elliptical shapes, or as a three-dimensional faceted shapes including, but not limited to, cubes, rectangles, pyramids, and other shapes.

Advantageously, the relatively small cross-sectional width 202 (FIG. 7) and/or the generally rounded shape (e.g., spherical) of the polymer nanoparticles 200 may allow for a relatively high concentration of polymer nanoparticles 200 within the resin 116 (FIG. 1) with a relatively small increase in resin viscosity. In some examples, the polymer nanoparticles 200 may constitute up to 75 percent by volume of a resin mixture 128 containing resin 116 and polymer nanoparticles 200. Preferably, the polymer nanoparticles 200 may constitute a minimum of 10 percent by volume of a resin mixture 128 as the low end of a range of volumetric percentage of polymer nanoparticles 200. However, in some examples, the polymer nanoparticles 200 may constitute no less than 5 percent by volume at the low end of the range. In still other examples, the polymer nanoparticles 200 may constitute no less than 10 percent by volume of the resin mixture 128 at the low end of the range. In further examples, the polymer nanoparticles 200 may constitute no less than 15 percent by volume at the low end of the range.

In certain applications, it may be desirable to provide the polymer nanoparticles 200 at a maximum of 65 percent by volume of a resin mixture 128 as a high end of a range of percentage by volume of polymer nanoparticles 200. However, in some examples, the polymer nanoparticles 200 may constitute no more than 50 percent by volume as the high end of the range. In certain applications, polymer nanoparticles 200 may be provided in any combination of the above-mentioned low end and high end of the range of volumetric percentage of polymer nanoparticles 200 of a resin mixture 128. Non-limiting examples of combinations of the above-mentioned low end and high end of a range of percentage by volume of polymer nanoparticles 200 include an arrangement wherein the polymer nanoparticles 200 constitute from 5-75 percent by volume of a resin mixture 128. Another example may include polymer nanoparticles 200 that constitute from 10-75 percent by volume of a resin mixture 128. In still other examples, the polymer nanoparticles 200 may constitute from 15-65 percent by volume of a resin mixture 128. In an even further example, the polymer nanoparticles 200 may constitute from 20-50 percent by volume of a resin mixture 128.

Advantageously, the generally rounded or spherical shape of the polymer nanoparticles 200 allows for linear improvements in the resin 116 properties with linear increases in the concentration level of polymer nanoparticles 200 in the resin 116 with minimal or negligible effect on resin viscosity. In addition, the rounded (e.g., spherical) shape and relatively small particle cross-sectional width 202 of the polymer nanoparticles 200 allows for a wide range in the concentration levels of the polymer nanoparticles 200 within the resin 116 to thereby allow for a wide range of improvements in one or more properties (e.g., reduced cure shrinkage, reduced CTE, reduced heat of reaction, etc.) of the resin 116 with minimal effect on resin viscosity and resin flow.

FIG. 3 shows a cross-section of a portion of the composite structure 100 of FIG. 2 and illustrating the reinforcing filaments 152 that make up the unidirectional composite plies 108. In the example shown, one or more of the composite plies 108 may be formed of unidirectional tape 154. The fibers 150 in one of the composite plies 108 may be oriented non-parallel to the fibers 150 in other composite plies 108. However, any one or more of the composite plies 108 may have a fiber orientation that is parallel to the fibers 150 in an adjacent composite ply 108. In FIG. 3, the reinforcing filaments 152 in the uppermost and lowermost composite plies 108 are oriented along a direction perpendicular to the plane of the paper. The reinforcing filaments 152 in the middle two composite plies 108 are oriented along a direction parallel to the plane of the paper. The reinforcing filaments 152 in the composite plies 108 located between the middle and uppermost composite ply 108, and between the middle and lowermost composite ply 108 may be oriented non-parallel and non perpendicular to the plane of paper. However, any one of the composite plies 108 may contain reinforcing filaments 152 having any orientation, without limitation.

FIG. 4 is an enlarged view of a portion of the composite layer of FIG. 3 and illustrating the resin 116 (FIG. 1) containing a plurality of polymer nanoparticles 200. In the example shown, the polymer nanoparticles 200 may be uniformly distributed throughout the composite layup 106. As indicated above, the polymer nanoparticles 200 may be included in a resin mixture 128 that may be used to pre-impregnate one or more of the composite plies 108 (e.g., prepreg) prior to laying up the composite plies 108 in a stacked formation. For example, a resin mixture 128 (FIG. 2) containing polymer nanoparticles 200 may be used to pre-impregnate any one of a variety of different fiber forms including, but not limited to, fiber tows, unidirectional tape, unidirectional sheet, woven fabric, braided fibers, and any one of a variety of other crimp and non-crimp fiber forms. Following the stacking of the prepreg composite plies 108, the viscosity of the resin 116 in the prepreg plies may be reduced by applying heat to the resin 116 and/or the composite layup 106 and which may allow the polymer-nanoparticle-entrained resin 116 in the composite plies 108 to flow and intermingle. The polymer nanoparticles 200 may become uniformly distributed throughout the composite layup 106, after which heat and/or pressure may be applied to consolidate and/or cure the composite layup 106 to form the final composite structure 100.

In another example, a composite layup 106 may be fabricated using dry fiber preforms such as dry unidirectional tape, dry unidirectional sheet, dry woven fabric, dry braided fibers, etc. A liquid resin mixture 128 (FIG. 2) containing polymer nanoparticles 200 may be infused into a composite layup 106 after which heat and/or pressure may be applied to consolidate and/or cure the composite layup 106. In a further example, a composite layup 106 may be formed of composite plies 108 (FIG. 4) that may be pre-impregnated with unmodified resin 116. During and/or following the layup of the prepreg composite plies 108, polymer nanoparticles 200 (FIG. 4) may be selectively applied to target locations in the composite layup 106 such as by applying and/or spraying a solution containing polymer nanoparticles 200 into resin-rich pockets (not shown) of the composite layup 106. In the present disclosure, a resin-rich pocket may be described as a high-resin-content location in the composite layup 106 or composite structure 100, or a location that has a large volume of resin 116 relative to the volume of fibers 150 (FIG. 3) at the specific location. Non-limiting examples of resin-rich pockets include the areas between opposing lateral sides of adjacent unidirectional tapes 154 in a composite ply 108, interlaminar regions 110 (FIG. 4) between upper and lower surfaces of overlapping composite plies 108, at divots and/or intersections of the fiber tows of woven fabric, and other locations that have a high content of resin 116 relative to the content of fibers 150 at that location.

In some examples, polymer nanoparticles 200 may be applied selectively throughout a composite structure 100. For example, polymer nanoparticles 200 may be applied at or between certain composite plies 108 (FIG. 4) of a composite layup 106 (e.g., only the middle plies, or only the end-most plies), while other composite plies 108 may be devoid of polymer nanoparticles 200 (FIG. 4). In another example, polymer nanoparticles 200 may be selectively applied in relatively thick regions (e.g., having a large quantity of plies) of a composite layup 106, and thinner regions (e.g., having a relatively smaller quantity of plies) of a composite layup 106 may be devoid of polymer nanoparticles 200. Placement of polymer nanoparticles 200 at one or more locations of a composite layup 106 (FIG. 4) may be performed manually and/or by using a robotic device (not shown). Polymer nanoparticles 200 may be applied onto reinforcing filaments 152 and/or to fiber tows 150 during manufacturing of the reinforcing filaments 152 and/or to fiber tows 150, and which may later be formed into unidirectional tape, unidirectional sheet, woven fabric, and other crimp and non-crimp fiber forms. Polymer nanoparticles 200 may also be applied to a fiber form (e.g., unidirectional tape, woven fabric, braided fibers, etc.) during prepregging operations.

Figure 5A:
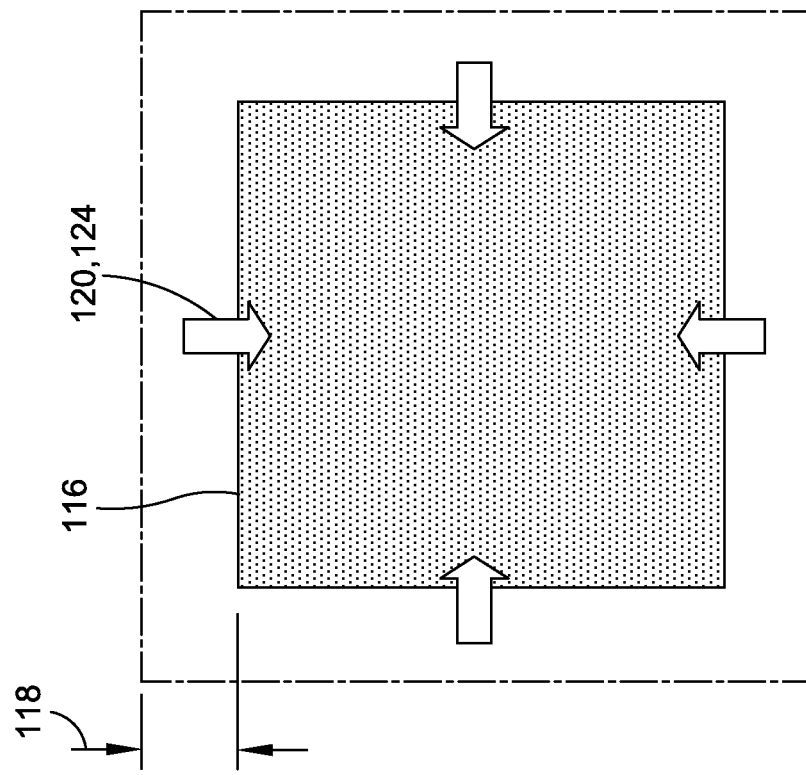
FIG. 5A is a schematic illustration of the net shrinkage of the cured unmodified resin of FIG. 5 occurring as a result of the resin cure shrinkage (e.g., during the cross-linking reaction) and/or due to the resin contraction during curing of the unmodified resin.
Figure 5:
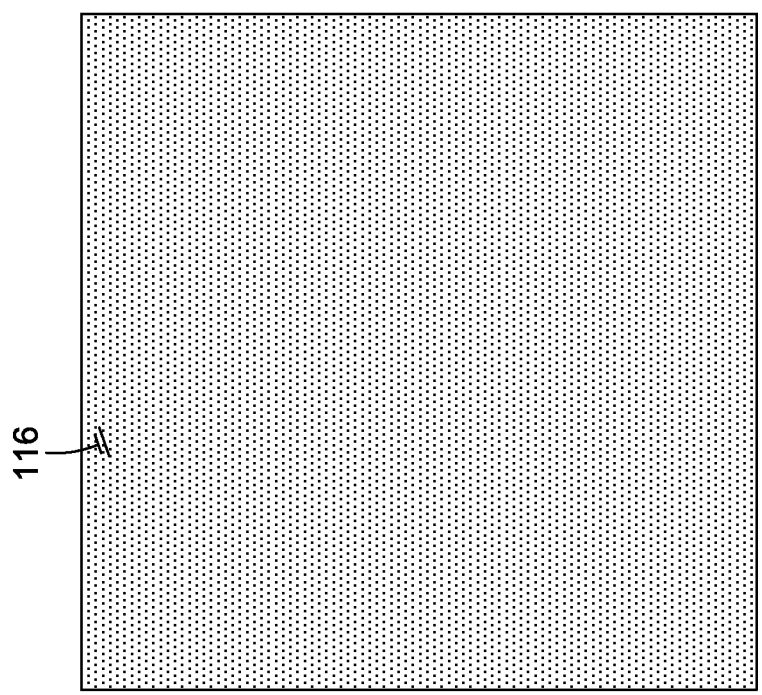
FIG. 5 is a schematic illustration of uncured unmodified resin with no nanoparticles in the unmodified resin.

FIG. 5 is a schematic illustration of a conventional uncured unmodified resin 116 with no nanoparticles in the unmodified resin 116. FIG. 5A is a schematic illustration of the conventional cured unmodified resin 116 of FIG. 5 and showing the resin net shrinkage 118 that may occur during and/or as a result of the curing of the unmodified resin 116. For example, the resin net shrinkage 118 may be the result of the resin cure shrinkage 120 of the resin 116, and/or the result of resin contraction 124 of the resin 116. Cure shrinkage may be described as the chemical shrinkage of a resin during the cross-linking or polymerization of the resin as the resin changes from a liquid to a solid. Contraction may be described as the shrinkage of a resin during cool down of the now-hardened or solidified composite structure 100 after curing.

FIG. 6 is a schematic illustration of a conventional uncured composite layup 106 made from unidirectional plies 112 (FIG. 4) and including unmodified resin 116. Reinforcing fibers 150 may be embedded within the unmodified resin 116. In the example shown, the composite structure 100 has a curved shape and includes changes in the direction of the reinforcing fibers 150. In one example, the reinforcing fibers 150 may be made of carbon and the unmodified resin 116 may be an epoxy resin. Also shown are phantom lines in FIG. 6 representing a geometric tolerance boundary 104 of the composite structure 100. The tolerance boundary 104 may represent an outer limit of the geometry or shape of the final, cured composite structure 100 as may be required such that the final composite structure 100 may fit with mating components.

FIG. 6A is a schematic illustration of the cured composite structure 100 of FIG. 6 showing shape distortion 102 in the overall shape of the composite structure 100 as a result of resin cure shrinkage 120 and/or resin contraction 124 (FIG. 5A) of the resin 116. In this regard, the curing of the unmodified thermoset resin 116 may result in resin cure shrinkage 120. In addition, during cool down of the cured composite structure 100 to ambient temperature, the resin 116 may thermally contract. The carbon reinforcing fibers 150 may physically constrain the shape of the composite structure 100 in a non-isotropic manner due to the resin-fiber CTE mismatch. The curvature of the composite structure 100 and the associated directional changes of the reinforcing fibers 150, coupled with any changes in the fiber volume fraction that may exist along the length of the composite structure 100 may result in an inhomogeneous dimensional change in the composite structure 100 during resin cure and cool down. In this regard, the high level of cure shrinkage and/or contraction of the epoxy resin 116 may result in significant distortion 102 of the overall shape of the cured composite structure 100 which may exceed the geometric tolerance boundary 104.

FIG. 7 is a schematic illustration of an uncured thermoset resin mixture 128 taken along line 7 of FIG. 4 containing a plurality of polymer nanoparticles 200 formed of a different material than the resin 116. In addition, the polymer nanoparticles 200 may have lower cure shrinkage 204 than the resin cure shrinkage 120. During the curing of the resin 116, the polymer nanoparticles 200 may also have a lower CTE 206 than the resin CTE 122 (FIG. 1). For example, the polymer nanoparticles 200 may be pre-cured or pre-solidified prior to the curing of the resin 116.

FIG. 7A is a schematic illustration of the cured resin mixture 128 of FIG. 7 and showing a reduction in the net shrinkage 130 of the resin mixture 128 relative to the net shrinkage 118 of the unmodified resin 116 as shown in FIG. 5. The reduction in the net shrinkage 130 of the resin mixture 128 in FIG. 7A may be the result of the lower cure shrinkage 204 and/or lower contraction 208 of the polymer nanoparticles 200. For example, the reduction in the net shrinkage 130 of the resin mixture 128 may be reduced as a result of a reduction in the total volume of resin 116 due to the polymer nanoparticles 200 occupying a portion of the resin 116. In addition, the reduction in the net shrinkage 130 of the resin mixture 128 may be the result of the polymer nanoparticles 200 isotropically constraining the cure shrinkage 118 of the resin 116. The reduction in the net shrinkage 130 of the resin mixture 128 may also be the result of an effective reduction in the resin mixture CTE 134 due to the addition polymer nanoparticles 200 with a lower nanoparticle CTE 206 relative to the resin CTE 122.

FIG. 8 is a schematic illustration of an uncured composite layup 106 made from unidirectional plies 112 similar to the composite layup 106 (FIG. 4) shown in FIG. 6, with the exception that the composite layup 106 of FIG. 8 may include a resin mixture 128 containing polymer nanoparticles 200. In one example, the polymer nanoparticles 200 may be formed of a material that is not made from the same constituents as the resin 116. In addition, as indicated above, the polymer nanoparticles 200 may be pre-cured and/or pre-solidified and may thereby avoid nanoparticle cure shrinkage 204 (FIG. 7A) during the curing of the resin 116.

FIG. 8A is a schematic illustration of the cured composite structure 100 of FIG. 8 showing a reduction in the shape distortion 102 (FIG. 6A) of the overall shape of the composite structure 100 relative to the distortion of the composite structure 100 shown in FIG. 6A. The reduction in shape distortion 102 in FIG. 8A may be the result of the nanoparticle cure shrinkage 204 being lower than the resin cure shrinkage 120, and/or the result of the nanoparticle contraction 208 (FIG. 7A) being lower than the resin contraction 124 due to the nanoparticle CTE 206 being lower than the resin CTE 122. In this regard, the addition of the polymer nanoparticles 200 provides a means to control the resin mixture CTE 134 such that a composite structure 100 may be manufactured with a final shape that is within the geometric tolerance boundary 104 (FIG. 6A).

FIG. 9 is a schematic illustration of an uncured resin mixture 128 containing a plurality of directional-CTE polymer nanoparticles 214. At least some of the directional-CTE polymer nanoparticles 214 in the resin mixture 128 may have having a CTE along at least one axis that is different than the CTE along another axis of the polymer nanoparticle 214. For example, the directional-CTE polymer nanoparticles 214 may have an axis along which the CTE is lower (e.g., the axis of lower CTE 216) than the CTE of the polymer nanoparticle 200 along another axis (e.g., the axis of higher CTE 218). In FIG. 9, the CTE axes of the polymer nanoparticles 214 are oriented in random directions. The directional-CTE polymer nanoparticles 214 may be formed of an anisotropic material such as a crystalline material. In some examples, the CTE axes of a nanoparticle 214 may be orthogonal to one another. For example, in FIG. 9, the axis of lower CTE 216 may be orthogonal to the axis of higher CTE 218. However, the CTE axes of a directional-CTE polymer nanoparticle 214 may be oriented non-orthogonal to one another. Furthermore, a directional-CTE polymer nanoparticle 214 may have more than two CTE axes with different levels of CTE. For example, a directional-CTE polymer nanoparticle 214 may have an axis of lower CTE 216, an axis of higher CTE 218 oriented orthogonal to the axis of lower CTE 216, and an axis of medium CTE (not shown) oriented orthogonal to the axis of lower CTE 216 and the axis of higher CTE 218. In some examples, it may be advantageous to align two or more of the CTE axes of a directional-CTE polymer nanoparticle 214 respectively along two or more directions associated with a composite layup 106 (FIG. 4).

FIG. 9A is a schematic illustration of a non-limiting example of a device for orienting the CTE axes of directional-CTE polymer nanoparticles 214. The example includes a spaced pair of elements 220 such as bars or plates across which a potential difference or charge may be applied to generate an electric and/or magnetic field. In one example, the directional-CTE polymer nanoparticles 214 may be configured such that diametrically opposite sides of each nanoparticle are oppositely charged along a selected CTE axis. Electric or magnetic field lines 222 may be generated by applying a potential difference across the spaced pair of elements 220, and causing the CTE axes of the polymer nanoparticles 214 to align with the magnetic field lines 222. In the example shown, the nanoparticles may be configured such that the axes of lower CTE 216 are aligned with the electric and/or magnetic field lines 222.

FIG. 10 is a schematic illustration of an uncured resin mixture 128 directional-CTE polymer nanoparticles 214 wherein the axes of lower CTE 216 are aligned with one another. Each one of the directional-CTE polymer nanoparticles 214 may also include an axis of higher CTE 218 which may be oriented orthogonally to the axes of lower CTE 214. FIG. 10A is a schematic illustration of the resin mixture 128 of FIG. 10 following curing of the resin mixture 128. The directional-CTE polymer nanoparticles 214 may result in lower contraction 224 of the resin mixture 128 along a direction parallel to the axes of lower CTE, and higher contraction 226 of the resin mixture 128 along a direction parallel to the axes of higher CTE.

FIG. 11 is a schematic illustration of a portion of the composite layup 106 of FIG. 4 showing directional-CTE polymer nanoparticles 214 contained in the resin mixture 128. The directional-CTE polymer nanoparticles 214 may be oriented to align the axes of lower CTE 214 along a common direction. For example, an electric or magnetic field may be applied to an uncured resin mixture 128 (FIG. 10) such that that the axes of lower CTE 216 are oriented transverse to a lengthwise direction of the reinforcing filaments 152 or fibers 150. Advantageously, a transverse orientation of the axes of lower CTE 214 may reduce contraction of the resin mixture 136 (FIGS. 7A and 12A) relative to contraction of unmodified resin. The reduced contraction along a direction transverse to the reinforcing fibers 150 may reduce thermally-induced stresses in the resin 116 which may prevent or reduce crack initiation or crack growth in the resin 116 during cool down of the resin 116 from curing and/or during thermal cycling of the composite structure 100 during service.

Figure 14A:
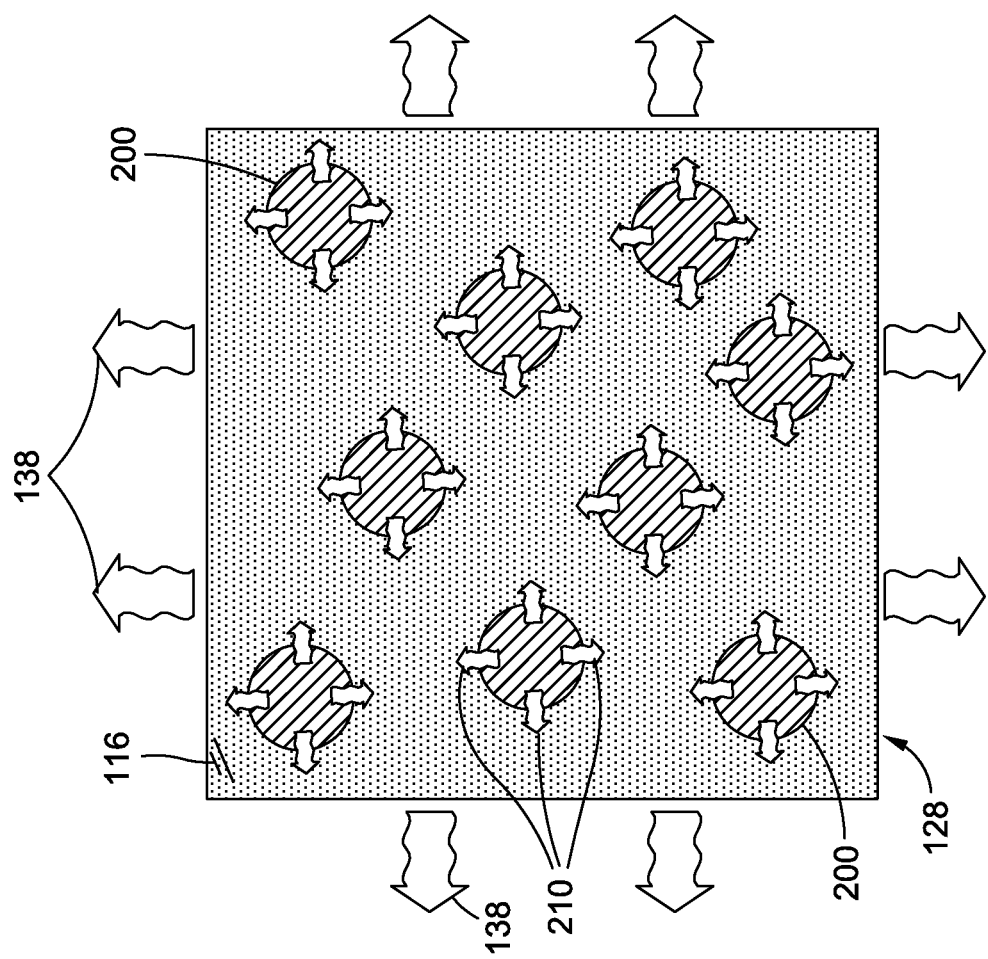
FIG. 14A is a schematic illustration of the at least partially cured polymer nanoparticles releasing a smaller amount of heat than the resin heat of reaction during curing of the resin mixture of FIG. 14.
Figure 14:
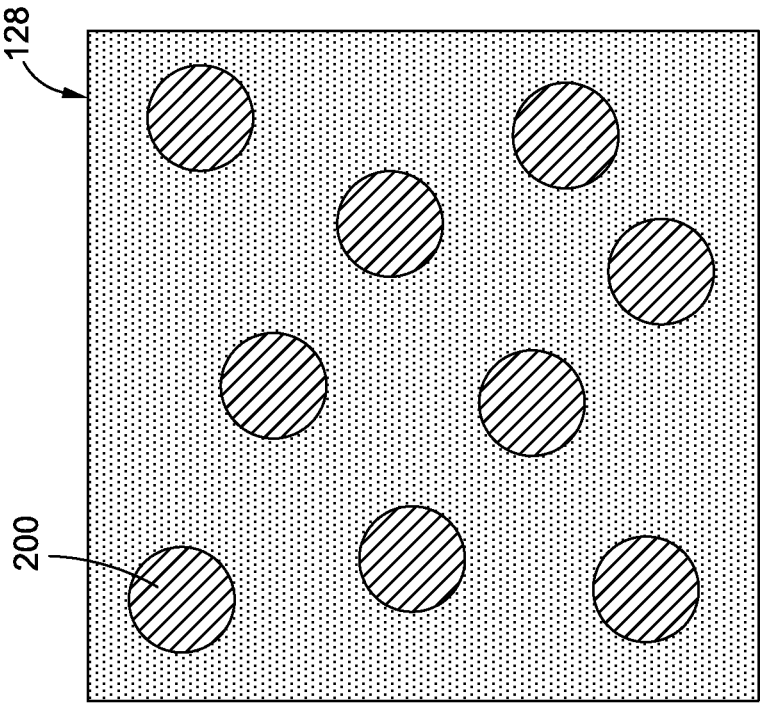
FIG. 14 is a schematic illustration of an uncured thermoset resin mixture containing a plurality of polymer nanoparticles formed of a different material than the resin.

FIG. 12 is a schematic illustration of an uncured resin mixture 128 including a thermoset resin 116 containing a plurality of cured polymer nanoparticles 200 formed of the same material as the thermoset resin 116. Due to the pre-curing of the polymer nanoparticles 200, the polymer nanoparticles 200 may have no cure shrinkage during curing of the resin 116. FIG. 12A is a schematic illustration of the cured resin mixture 128 of FIG. 14 showing a reduction in the net shrinkage 132 relative to the net shrinkage 118 of unmodified resin 116 as shown in FIG. 5A. The reduction in the net shrinkage 132 of the resin mixture 128 may be due to the absence of cure shrinkage of the cured polymer nanoparticles 200. In addition, the reduction in net shrinkage of the resin mixture 128 may also be due to the polymer nanoparticles 200 physically constraining the resin cure shrinkage 120 and/or the resin contraction 124.

Figure 13A:
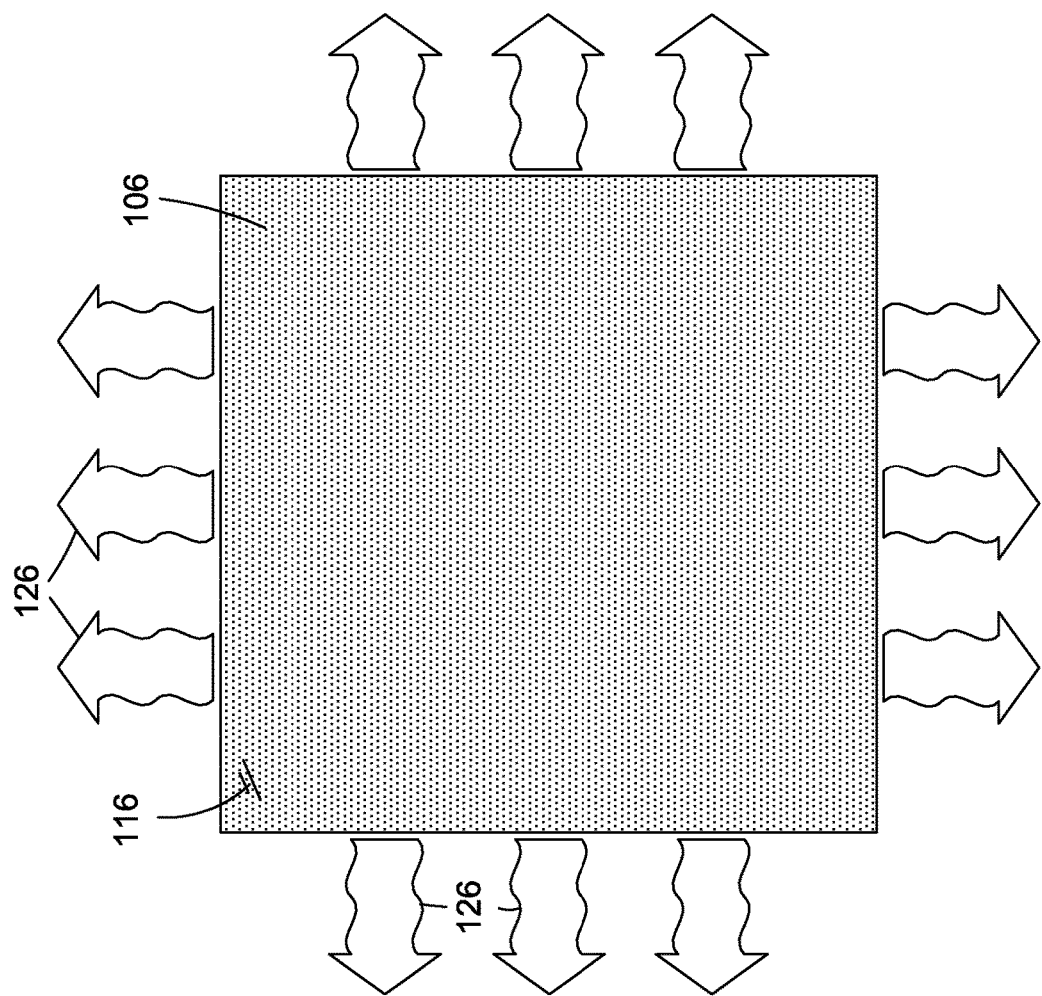
FIG. 13A is a schematic illustration of the cured unmodified thermoset resin of FIG. 13 and the heat of reaction of the cured unmodified thermoset resin.
Figure 13:
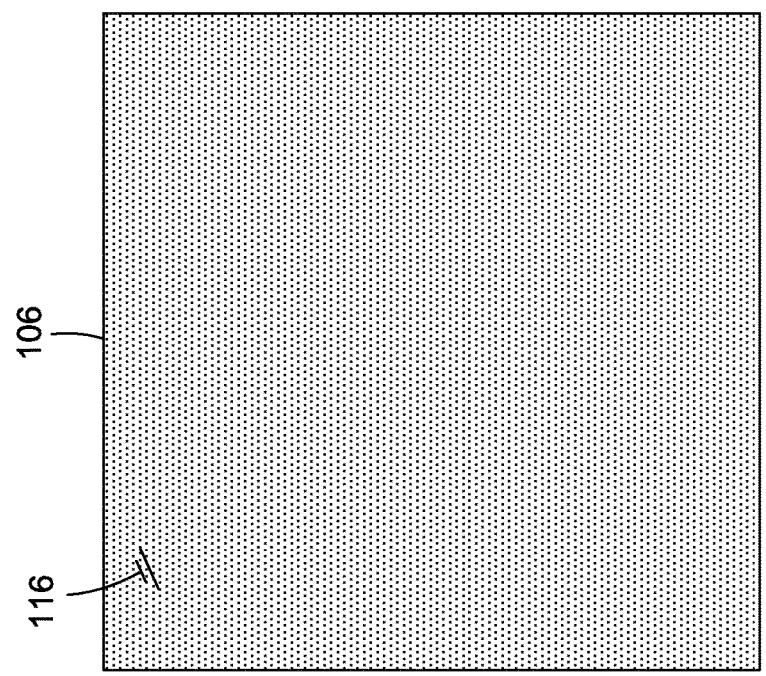
FIG. 13 is a schematic illustration of uncured unmodified thermoset resin (i.e., no nanoparticles in the unmodified resin)

FIG. 13 is a schematic illustration of a conventional uncured unmodified thermoset resin 116 with no nanoparticles in the unmodified resin 116. FIG. 13A is a schematic illustration of the cured unmodified thermoset resin 116 of FIG. 13 and showing significant heat of reaction 126 generated by the unmodified thermoset resin 116 during cure. As indicated above, a large amount of heat release 126 during curing of a resin 116 may undesirably increase the temperature of a composite layup 106 during curing. The large heat release 126 may result in distortion or warpage of the final shape of the composite structure 100 (FIG. 11), particularly in thick sections of the composite layup 106. Furthermore, the large heat release 126 during curing of a resin 116 may result in a reduction in the mechanical properties of the resin 116 due to overheating, and may additionally result in hazardous combustion of the resin 116, and/or changes in the extent of cure the resin 116 during the curing cycle.

FIG. 14 is a schematic illustration of an uncured thermoset resin mixture 128 advantageously containing a plurality of polymer nanoparticles 200 formed of a different material than the resin 116. In addition, the polymer nanoparticles 200 may have a nanoparticle heat of reaction 210 (FIG. 14A) that may be lower than the resin heat of reaction 126 (FIG. 13A) during resin cure. FIG. 14A is a schematic illustration of the cured thermoset resin mixture 128 of FIG. 14 and showing a reduced heat of reaction 138 of the resin mixture 128 relative to the heat of reaction 126 of the unmodified resin 116 shown in FIG. 13A. The reduction in the heat of reaction 138 of the resin mixture 128 in FIG. 14A may result in a net reduction in part temperature which may advantageously reduce the amount of part distortion otherwise caused by non-uniform part temperatures in a composite layup during resin cure, and/or may avoid exceeding the resin degradation temperature during resin cure. Additionally, the use of nanoparticles 200 with a lower nanoparticle CTE 206 may further reduce internal stresses caused by resin-fiber CTE mismatch.

Figure 15A:
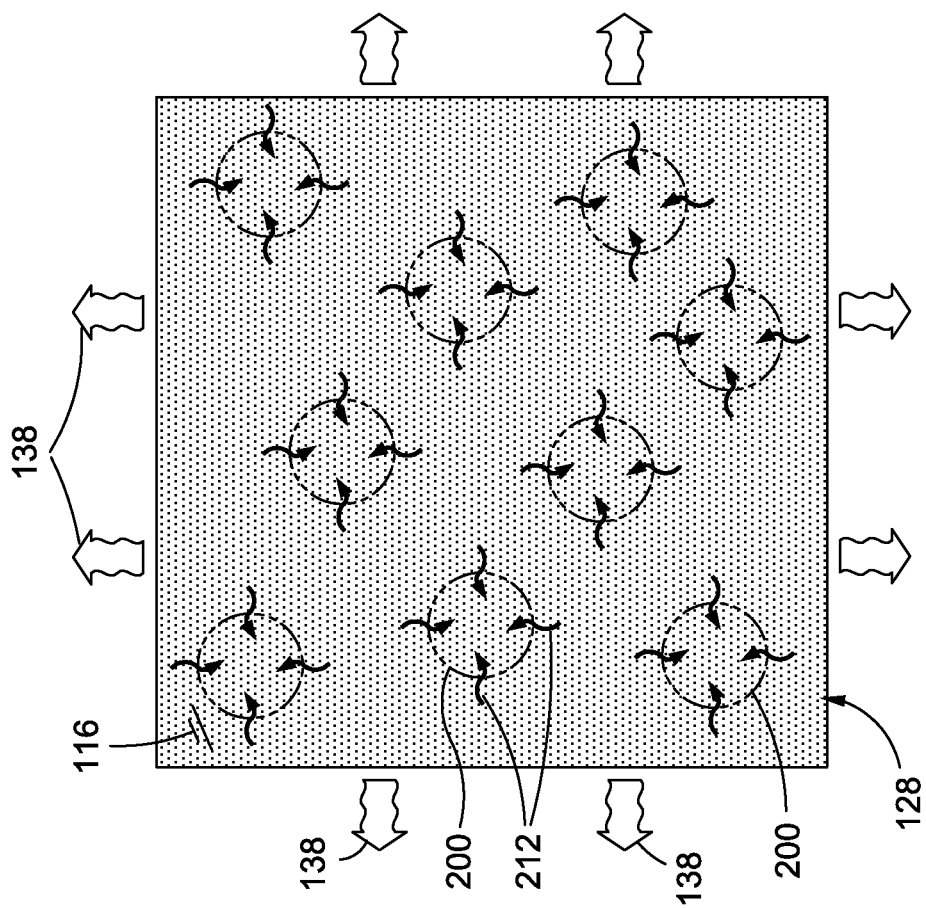
FIG. 15A is a schematic illustration of the at least partially cured polymer nanoparticles absorbing a portion of the resin heat of reaction during curing of the resin mixture of FIG. 14.
Figure 15:
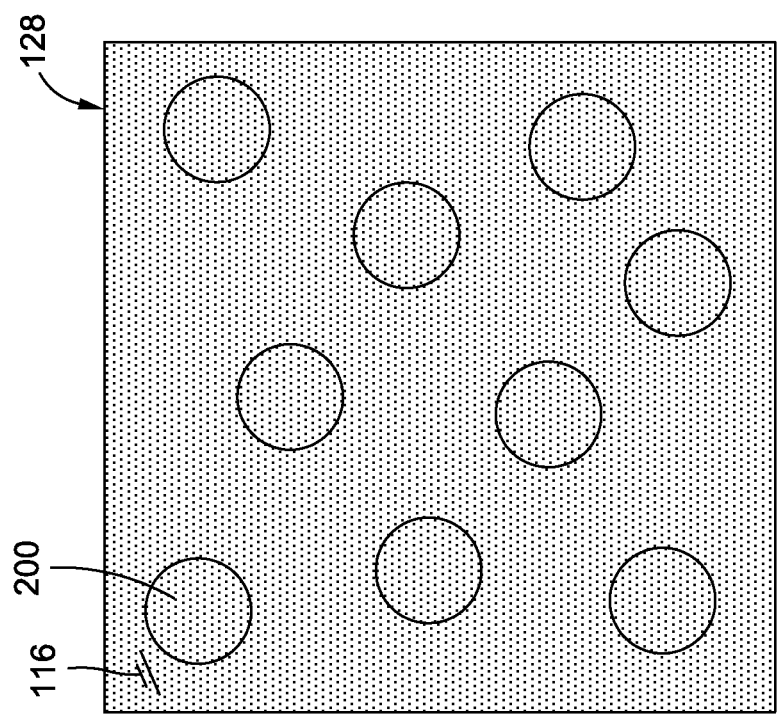
FIG. 15 is a schematic illustration of an uncured thermoset resin mixture containing a plurality of at least partially cured polymer nanoparticles formed of the same material as the resin.

FIG. 15 is a schematic illustration of an uncured thermoset resin mixture 128 containing a plurality of cured polymer nanoparticles 200 formed of the same material as the resin 116. The cured polymer nanoparticles 200 may exhibit no (e.g., zero) nanoparticle heat of reaction 210 during resin cure. In some examples, polymer nanoparticles 200 formed of the same or different material than the resin may have a nanoparticle heat capacity (Cp) that may be selected to reduce a maximum temperature of the resin 116. FIG. 15A is a schematic illustration of the cured thermoset resin mixture 128 of FIG. 15. The cured polymer nanoparticles 200 may function as a non-reactive heat sink and may absorb a portion of the resin heat of reaction 126 (FIG. 13A) during resin cure, and which may result in a reduction in the part temperature due to the lower amount of heat generated by the curing resin 116. As indicated above, a reduction in the heat of reaction 138 may reduce the part temperature during resin cure which may advantageously reduce the amount of part distortion otherwise caused by non-uniform part temperatures in the composite layup. In addition, a reduction in the temperature of the composite structure 100 may avoid exceeding the degradation or combustion temperature of the resin 116.

FIG. 16 is a plot of a slow cure cycle and a fast cure cycle of a conventional composite layup 106 which may be formed of reinforcing fibers 150 embedded in unmodified resin 116 (FIG. 8A). For example, the reinforcing fibers 150 may be carbon fibers embedded in epoxy resin. The plot of FIG. 16 plots resin cure time 250 along the horizontal axis, and cure temperature 252 along the vertical axis. The plot includes a dashed horizontal line representing the combustion temperature limit 254 of the resin 116, and a dotted horizontal line representing the degradation temperature limit 256 of the resin 116. The plot illustrates a fast cure part temperature 258 and a fast cure oven temperature 260 as may be used in a fast cure cycle of the composite layup 106 (FIG. 13A). The plot also illustrates a slow cure part temperature 262 and a slow cure oven temperature 264 as may be used in a slow cure cycle of the composite layup 106. As can be seen, during the slow cure cycle and during the fast cure cycle, the resin heat of reaction 126 (FIG. 13A) increases the temperature of the composite layup 106 to above the cure temperature as set by an oven or autoclave.

When the fast cure cycle is used, the temperature of the composite layup 106 may exceed the combustion temperature limit 254 (FIG. 16) of the resin 116 which may result in damage to the composite layup 106 (FIG. 13A) due to overheating. As indicated above, exceeding the degradation temperature limit 256 may also result in a reduction in the mechanical strength and performance of the resin 116 (FIG. 15A) which may compromise the integrity of the composite structure 100. In addition, exceeding the combustion temperature limit 254 may potentially result in combustion or fire with the potential for damaging the surrounding composite structure 100 and equipment.

Using the slow cure cycle may mitigate damage to the composite layup 106 (FIG. 13A) to avoid overheating. The slow cure cycle may provide additional time for the resin heat of reaction 126 (FIG. 13A) to dissipate from the composite layup 106 during cure and which may reduce the temperature overshoot such that the maximum temperature of the composite layup 106 remains below the degradation temperature limit 256 of the resin 116 (FIG. 15A). However, the slow cure cycle increases the overall processing time for manufacturing a composite structure 100.

Figure 17:
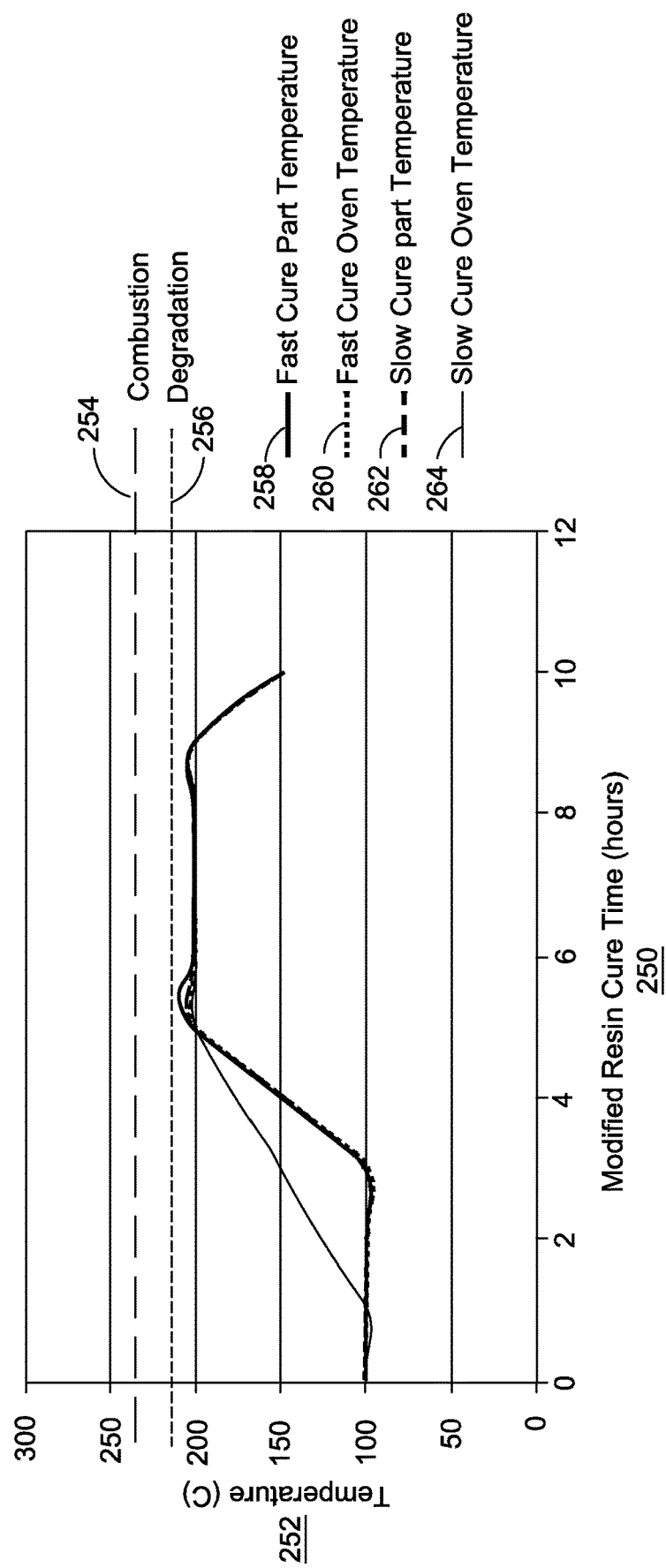
FIG. 17 is a time-temperature plot of the cure cycle of a composite layup including a resin mixture containing polymer nanoparticles and illustrating the temperature remaining below the degradation temperature and the combustion temperature and thereby avoiding damage to the composite layup from overheating during fast cure cycles.

FIG. 17 is a plot of the slow cure cycle and the fast cure cycle of a composite layup 106 including a resin mixture 128 containing polymer nanoparticles 200. As indicated above, the polymer nanoparticles 200 may have a nanoparticle cure shrinkage 204 (FIG. 7A) that is less than the resin cure shrinkage 120 (FIG. 5A), a nanoparticle CTE 206 that is lower or different than the resin CTE 122, and/or a nanoparticle heat of reaction 210 that is less than the resin heat of reaction 126. When the slow cure cycle or a fast cure cycle are used for curing a composite layup 106 (FIG. 13A), the polymer nanoparticles 200 result in a net reduction in the heat of reaction 138 of the resin mixture 128 (FIG. 15A) during curing as compared to the heat of reaction 126 of an unmodified resin 116 as shown in FIG. 16. The reduction in the heat of reaction 138 of the resin mixture 128 results in a reduction in the temperature of the composite layup 106 which may thereby avoid damage due to overheating.

Figure 18:
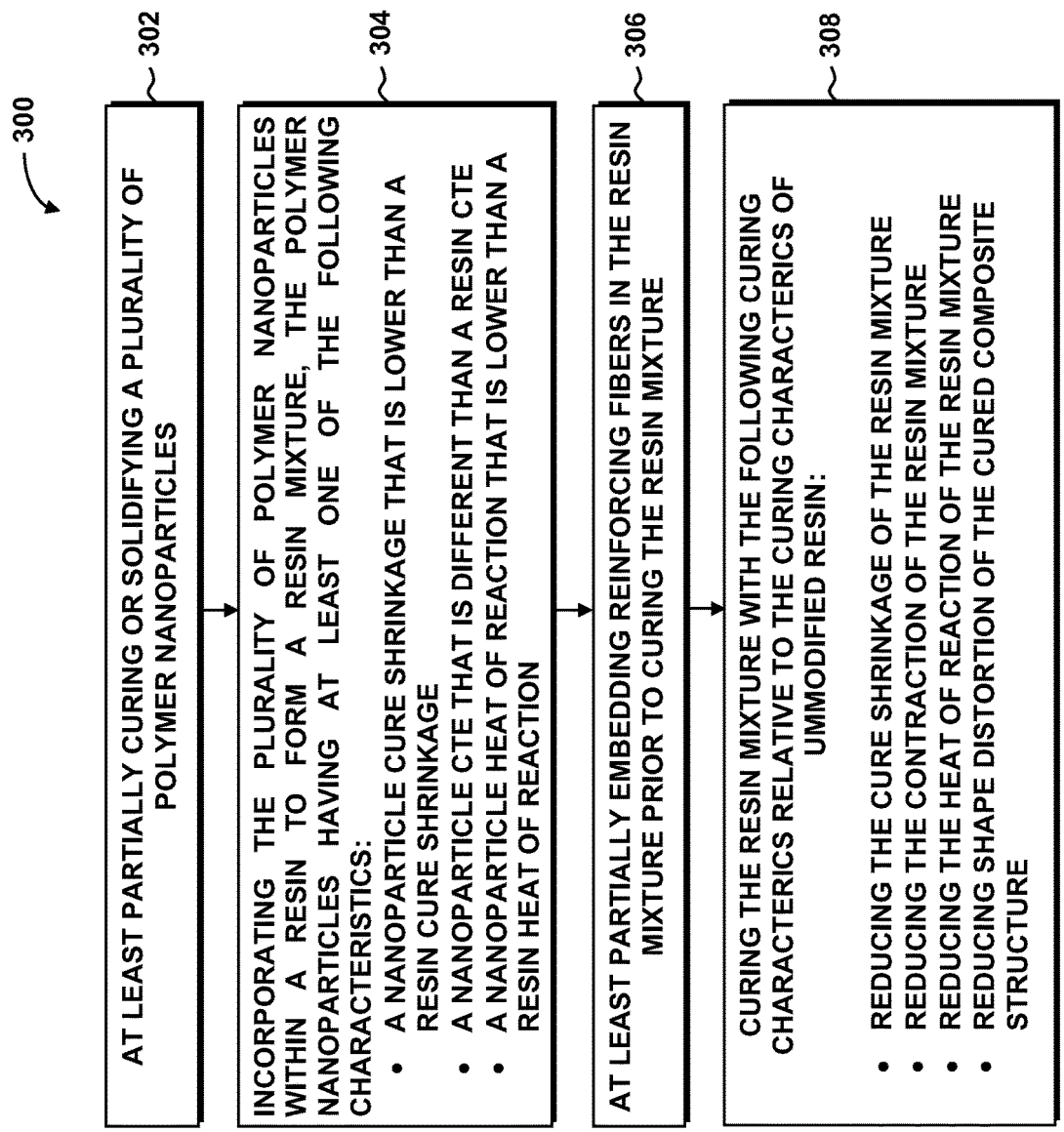
FIG. 18 is a flowchart illustrating one or more operations that may be included in a method of manufacturing a composite structure.

FIG. 18 is a flowchart illustrating one or more operations that may be included in a method 300 of manufacturing a composite structure 100. Step 302 of the method 300 may include providing a plurality of polymer nanoparticles 200, and at least partially curing or solidifying the polymer nanoparticles 200 prior to curing the resin 116. As indicated above, the polymer nanoparticles 200 (FIG. 4) may be formed of any one of a variety of different thermosetting materials or thermoplastic materials. In some examples, the method may include fabricating the polymer nanoparticles 200 externally prior to mixing with the resin 116 (FIG. 5). The polymer nanoparticles 200 may be formed in a relatively small size and may have a generally rounded or spherical shape to avoid increasing the resin viscosity. The relatively small size of the polymer nanoparticles 200 may reduce or minimize the effect of the polymer nanoparticles 200 on the ability of the resin 116 to flow and/or infuse into the fibers 150 of a composite layup 106. As indicated above, the polymer nanoparticles 200 may have a particle cross-sectional width 202 (FIG. 7) of from 10-200 nanometers. In some examples, the resin mixture 128 (FIG. 3) may include polymer nanoparticles 200 that have a particle cross-sectional width 202 that is different than the particle cross-sectional width 202 of other polymer nanoparticles 200 in the resin mixture 128.

In some examples, the polymer nanoparticles 200 may be formed of the same material as the resin 116 and may be partially or fully cured or solidified prior to curing the resin 116. In other examples, the polymer nanoparticles 200 may be formed of a different material than the resin 116 (FIG. 7), and may be partially or fully cured or solidified prior to curing the resin 116. In still further examples, a resin mixture 128 (FIG. 7) may contain some polymer nanoparticles 200 formed of one material, and other polymer nanoparticles 200 in the resin mixture 128 may be formed of a different material. In this regard, providing polymer nanoparticles 200 (FIG. 7) formed of different materials and the same resin mixture 128 may provide a means for altering different properties of the resin 116. For example, some of the polymer nanoparticles 200 in a resin mixture 128 may be formed of a material that has a nanoparticle cure shrinkage 204 (FIG. 7A) that is less (e.g., during the resin 116 cure cycle) than the resin cure shrinkage 120 as a means to reduce the cumulative volumetric shrinkage 130 of the resin mixture 128. The same resin mixture 128 may also include polymer nanoparticles 200 which may be formed of another material which may have a lower nanoparticle heat of reaction 210 than the resin heat of reaction 126 as a means to reduce the total amount of heat generated during resin cure and thereby maintain the temperature of the resin 116 and composite layup 106 below predetermined limits such as below the degradation temperature 256 or below the combustion temperature 254 (FIG. 16).

Step 304 of the method 300 may include incorporating or mixing the plurality of polymer nanoparticles 200 within resin 116 (FIG. 8A) to form a resin mixture 128. Advantageously, the relatively small size and the rounded or spherical shape of the polymer nanoparticles 200 enables high load levels of polymer nanoparticles 200 in the resin mixture 128 (FIG. 8A) with minimal effect on resin viscosity. As indicated above, the polymer nanoparticles 200 may constitute up to 75 percent by volume of the resin mixture 128. Preferably, the polymer nanoparticles 200 may constitute a minimum of 10 percent by volume of a resin mixture 128 as the low end of a range of volumetric percentage of polymer nanoparticles 200. However, polymer nanoparticles 200 may be provided in any combination of the above-mentioned low end and high end of the range of volumetric percentage of polymer nanoparticles 200 of a resin mixture 128. As was also indicated above, some of the polymer nanoparticles 200 (FIG. 8) in a resin mixture 128 may have a different particle cross-sectional width 202 than other polymer nanoparticles 200 in the resin mixture 128. For example, a resin mixture 128 may include high-heat-capacity polymer nanoparticles 200 of a relatively large diameter for the purpose of increasing the heat absorption 212 (FIG. 15A) capability of the polymer nanoparticles 200. The same resin mixture 128 may also include polymer nanoparticles 200 of a smaller diameter which may be added for the purpose of reducing resin cure shrinkage 120 or reducing the resin heat of reaction 126 (FIG. 13A).

Step 306 of the method 300 may include embedding reinforcing fibers 150 in the resin mixture 128 prior to curing or solidifying the resin mixture 128. As indicated above, polymer nanoparticles 200 may be added to thermosetting resins 116 (FIG. 10) and to thermoplastic resins 116 of prepreg systems and resin infusion systems. For example, the method may include pre-impregnating composite plies 108 of various fiber forms (e.g., fiber tows, unidirectional tape, woven fabric, braided fibers, etc.) with a resin mixture 128 (FIG. 10) containing polymer nanoparticles 200, and then laying up the prepreg composite plies 108 to form a composite layup 106 (FIG. 11). Alternatively, the method may include laying up composite plies 108 that may be pre-impregnated with unmodified resin 116, after which polymer nanoparticles 200 (FIG. 12) may be applied to one or more locations of the composite layup 106. In a further example, the method may include laying up dry fiber preforms which may be infused with resin 116 which may contain polymer nanoparticles 200, or laying up dry fiber preforms followed by infusing with unmodified resin 116 and then applying polymer nanoparticles 200 to one or more locations of the composite layup 106.

Step 308 of the method 300 may include curing or solidifying the resin mixture 128 which may include applying heat and/or pressure to the composite layup 106. The incorporation of polymer nanoparticles 200 in the resin 116 (FIG. 14A) may improve the curing properties of the resin 116 and improve the mechanical performance of the composite structure. For example, polymer nanoparticles 200 (FIG. 14A) having relatively low nanoparticle cure shrinkage 204 may reduce dimensional or volumetric shrinkage relative to the volumetric shrinkage exhibit by unmodified resin 116. Polymer nanoparticles 200 with a low CTE may provide a means to control the CTE of the resin mixture 128 (FIG. 14A) to reduce internal stress in the composite structure 100 during the cure cycle and reduce shape distortion 102 (FIG. 6A) of the cured composite structure 100.

The method may further include providing in the resin 116 at least some polymer nanoparticles 200 that have a predetermined nanoparticle heat capacity ($C_p$) selected to reduce a maximum temperature of the resin 116 (FIG. 15A). The method may additionally include absorbing a portion of the resin heat of reaction 126 (FIG. 13A) into the polymer nanoparticles 200 during curing of the resin mixture 128. As a result of the nanoparticle heat capacity, the method may include reducing a maximum temperature of the resin mixture 128 (FIG. 15A) in response to absorbing the resin heat of reaction 126 into the polymer nanoparticles 200. As indicated above, polymer nanoparticles 200 (FIG. 15A) with a low heat of reaction may reduce shape distortion 102 of the cured composite structure 100 by reducing the total amount of heat generated during curing and thereby reducing the temperature of the composite layup 106 (FIG. 13A) during curing which may reduce changes in the part shape due to thicker sections of the composite layup 106 curing earlier and hotter than thinner sections.

In some examples, the method may include coupling a plurality of polymer nanoparticles 200 to one or more reinforcing filaments 152 to act as spacers to prevent the reinforcing filaments 152 from touching one another and to control the permeability of the filaments 152. The polymer nanoparticles 200 may be applied to reinforcing filaments 152 as the reinforcing filaments 152 are drawn from a fiber forming apparatus (not shown). In other examples, polymer nanoparticles 200 may be applied to reinforcing filaments 152 as the fiber tows 150 are formed into unidirectional tape, unidirectional sheet, woven fabric, braided fibers, and other fiber forms. Polymer nanoparticles 200 may also be coupled to or applied to one or more reinforcing filaments 152 during prepregging operations wherein resin 116 is applied to fiber tows, unidirectional tape, woven fabric, braided fibers, and other fiber forms.

In some examples, polymer nanoparticles 200 may be melt-fused to the reinforcing filaments 152. For example, the polymer nanoparticles 200 may be formed of thermoplastic material or the polymer nanoparticles 200 may be configured as core-sheath nanoparticles (not shown) each having a thermoplastic sheath surrounding a core. The reinforcing filaments 152 and/or the sheaths of the polymer nanoparticles may be heated to a temperature causing the outer portion of the core-sheath nanoparticles to bond or melt-fuse to the reinforcing filaments 152 when the core-sheath nanoparticles come into contact with the reinforcing filaments 152.

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composition, comprising: an uncured resin mixture, including:
an uncured liquid resin formed of thermosetting material that cures upon the application of heat and having a resin cure shrinkage;
a plurality of non-core-sheath polymer nanoparticles formed of thermosetting material being in a partially cured state that cures upon the application of heat;
the thermosetting material of the polymer nanoparticles and the thermosetting material of the resin being selected from the group consisting of one of polyurethanes, phenolics, polyimides, benzoxazines, bismaleimides, cyanate esters, polyesters, epoxies, thiols, and silsesquioxanes;
the plurality of polymer nanoparticles having a nanoparticle cure shrinkage that is less than the resin cure shrinkage;
wherein the resin cure shrinkage and the nanoparticle cure shrinkage are respective properties of the uncured liquid resin and the polymer nanoparticles cured by the application of heat;
wherein at least some of the polymer nanoparticles are directional-CTE polymer nanoparticles each having an axis of lower CTE (coefficient of thermal expansion) and an axis of higher CTE and having a spherical shape; and
in each directional-CTE polymer nanoparticle, the axis of higher CTE is oriented in a different direction than the axis of lower CTE.

2. The composition of claim 1, wherein:
at least some of the polymer nanoparticles in the uncured resin mixture are formed of a material having different chemical composition than other polymer nanoparticles formed of thermosetting material in the uncured resin mixture.

3. The composition of claim 1, wherein:
the polymer nanoparticles have a particle cross-sectional width of 10-200 nanometers.

4. The composition of claim 1, wherein:
at least some of the polymer nanoparticles have a particle cross-sectional width that is different than a particle cross-sectional of other polymer nanoparticles formed of thermosetting material in the uncured resin mixture.

5. The composition of claim 1, wherein:
at least some of the polymer nanoparticles are a solid homogenous sphere or a hollow homogenous sphere.

6. The composition of claim 1, wherein:
the polymer nanoparticles constitute no less than 10 percent by volume of the uncured resin mixture.

7. The composition of claim 1, wherein:
the polymer nanoparticles constitute up to 75 percent by volume of the uncured resin mixture.

8. The composition of claim 1, wherein:
the uncured resin mixture is at least one of the following: a coating, an adhesive, an injection moldable plastic, or a resin matrix of an uncured composite layup.

9. A method of forming a composition, comprising:
incorporating a plurality of non-core-sheath polymer nanoparticles within an uncured liquid resin to form an uncured resin mixture, the uncured liquid resin formed of a thermosetting material that cures upon the application of heat, the polymer nanoparticles formed of thermosetting material being in a partially cured state that cures upon the application of heat, the thermosetting material of the polymer nanoparticles and the thermosetting material of the resin being selected from the group consisting of one of polyurethanes, phenolics, polyimides, benzoxazines, bismaleimides, cyanate esters, polyesters, epoxies, thiols, and silsesquioxanes;
the polymer nanoparticles having a nanoparticle cure shrinkage that is less than the resin cure shrinkage;

wherein the resin cure shrinkage and the nanoparticle cure shrinkage are respective properties of the uncured liquid resin and the polymer nanoparticles cured by the application of heat;

wherein at least some of the polymer nanoparticles are directional-CTE polymer nanoparticles each having an axis of lower CTE (coefficient of thermal expansion) and an axis of higher CTE and having a spherical shape; and in each directional-CTE polymer nanoparticle, the axis of higher CTE is oriented in a different direction than the axis of lower CTE.

10. The method of claim 9, wherein at least some of the polymer nanoparticles comprise:

polymer nanoparticles having a non-elastomeric thermoset component.

11. The method of claim 9, further including:

including in the uncured resin mixture at least some polymer nanoparticles having a predetermined nanoparticle heat capacity selected to reduce a maximum temperature of the uncured liquid resin;

absorbing a portion of a resin heat of reaction into the polymer nanoparticles during the curing of the uncured resin mixture; and reducing a maximum temperature of the uncured resin mixture in response to absorbing the resin heat of reaction into the polymer nanoparticles.

12. The method of claim 9, further including:

at least partially embedding reinforcing fibers in the uncured resin mixture prior to curing or solidifying the uncured resin mixture.

13. The method of claim 9, wherein:

the polymer nanoparticles have a particle cross-sectional width of 10-200 nanometers.

14. The method of claim 9, wherein:

the polymer nanoparticles constitute no less than 20 percent by volume of the uncured resin mixture.

15. The method of claim 9, wherein:

the polymer nanoparticles constitute up to 75 percent by volume of the uncured resin mixture.

16. The method of claim 9, further including:

rotating, prior to the curing the uncured resin mixture, at least some of the polymer nanoparticles until the axis of lower CTE of at least some of the polymer nanoparticles is oriented parallel to at least one common direction.

17. The composition of claim 1, wherein:

at least some of the polymer nanoparticles having a coefficient of thermal expansion (CTE) that is different than a CTE of the uncured liquid resin.

18. The composition of claim 1, wherein:

the axes of lower CTE of the directional-CTE polymer nanoparticles are aligned with each other in the uncured liquid resin.

19. The composition of claim 1, wherein:

the axis of higher CTE is orthogonal to the axis of lower CTE.

20. The method of claim 12, wherein:

the reinforcing fibers comprise carbon reinforcement filaments and/or glass reinforcement filaments.

* * * * *